(12) United States Patent
Yoshimaru

(10) Patent No.: US 6,288,818 B1
(45) Date of Patent: Sep. 11, 2001

(54) OPTICAL SCANNING APPARATUS

(75) Inventor: Akito Yoshimaru, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/466,790

(22) Filed: Dec. 20, 1999

(30) Foreign Application Priority Data

Dec. 22, 1998 (JP) .................................................. 10-365095
Mar. 19, 1999 (JP) .................................................. 11-075544

(51) Int. Cl.$^7$ .................................................. G02B 26/08
(52) U.S. Cl. ........................ 359/204; 359/203; 359/216; 347/233; 347/235
(58) Field of Search ..................................... 359/201, 203, 359/204, 216–219; 347/233, 225, 234, 243, 248, 250

(56) References Cited

U.S. PATENT DOCUMENTS 5,825,522 * 10/1998 Takano et al. ........................ 359/201
5,930,019 * 7/1999 Suzuki et al. ......................... 359/204
6,097,418 * 8/2000 Larsen et al. ......................... 347/235

FOREIGN PATENT DOCUMENTS 61-11720   1/1986 (JP) .
6-208066   7/1994 (JP) .
8-72308    3/1996 (JP) .

* cited by examiner

Primary Examiner—James Phan
(74) Attorney, Agent, or Firm—Oblon, Spivak, McClelland, Maier & Neustadt, P.C.

(57) ABSTRACT

An optical scanning apparatus includes a plurality of light sources which emit first and second beams. First and second coupling lens units respectively couple the first and second beams emitted by the plurality of light sources. A rotary deflector which has pairs of mutually-opposite reflection surfaces and deflects the first beam in a first direction by one of the reflection surfaces and deflects the second beam in a second direction opposite to the first direction, by another of the reflection surfaces. First and second imaging units scan an image surface of a photoconductive medium along a first half of a main scanning line by focusing and deflecting the deflected first beam onto the image surface, and scan the image surface along a second half of the main scanning line by focusing and deflecting the deflected second beam onto the image surface, such that the first and second halves form a substantially straight scanning line on the image surface when the rotary deflector is rotated.

17 Claims, 18 Drawing Sheets

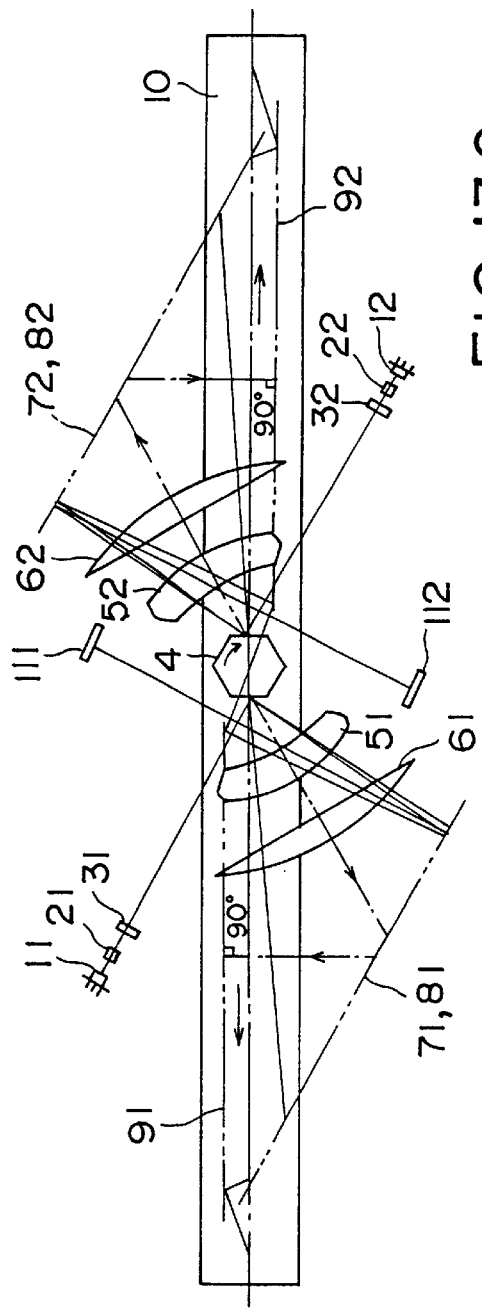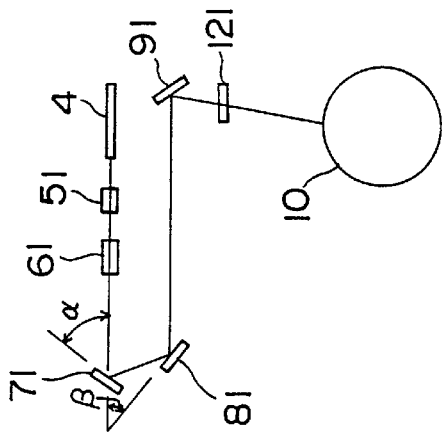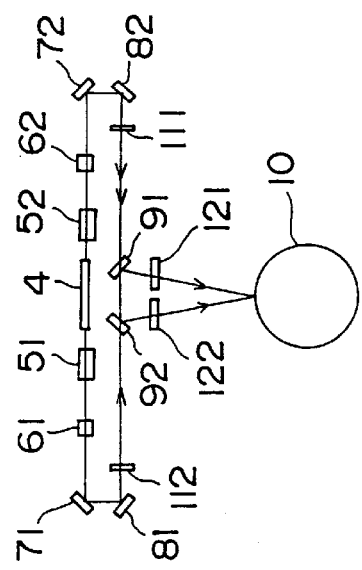

OPTICAL SCANNING APPARATUS

BACKGROUND OF THE INVENTION

(1) Field of the Invention

The present invention relates to an optical scanning apparatus which linearly scans an image surface of a photoconductive medium in a main scanning direction by exposing the photoconductive medium to a light beam pattern so as to produce an image on the image surface. The optical scanning apparatus of the present invention is applicable to an optical writing module for use in image forming systems such as digital copiers, printers or facsimiles.

(2) Description of the Related Art

An image forming system, such as digital copier, printer or facsimile, which reproduces an image with a large size, such as A0 A1 size, is known. Generally, the image forming systems of this kind are provided with an optical scanning apparatus. The optical scanning apparatus linearly scans an image surface of a photoconductive medium in a main scanning direction by exposing the photoconductive medium to a light beam pattern so as to produce an image on the image surface. In order to achieve the reproduction of large-size copies, it is needed for the optical scanning apparatus to enlarge the effective scanning range on the image surface so as to cover the desired size.

When it is intended to enlarge the effective scanning range of the optical scanning apparatus, one may encounter some technical restrictions of optical systems in the optical scanning apparatus. Currently, the dominant optical scanning apparatus which is adapted to reproduce large-size copies employs a light-emitting diode (LED) array as the light source. The LED array can be easily configured to match the desired size. However, the LED optical scanning apparatus is bulkier and more expensive than an laser-diode (LD) optical scanning apparatus, and there is no denying that the image quality created by the LED optical scanning apparatus is lower than the image quality created by the LD optical scanning apparatus.

Hence, there is the demand for an LD optical scanning apparatus which is configured in a compact, inexpensive structure and produces a large-size image on an image surface of a photoconductive medium with an improved image quality. The LD emits a laser beam and it is widely used as the light source of the image forming system.

As disclosed in Japanese Laid-Open Patent Applications No.61-11720 and No.6-208066, there is known an LD optical scanning apparatus which linearly scans an image surface of a photoconductive medium in a main scanning direction by exposing the photoconductive medium to a light beam pattern so as to produce a large-size image on the image surface.

In order to ensure an elongated scanning range of the light beam on the image surface of the photoconductive medium so as to cover the desired size (such as A0 A1 size), the above-mentioned optical scanning apparatus utilizes a combination of two optical writing modules. Each of the two writing modules includes a rotary polygonal mirror provided as a rotary deflector, and the two polygonal mirrors are rotated independently of each other when scanning the image surface along the same scanning line. Because of the use of the two polygonal mirrors, it is difficult for the above optical scanning apparatus to synchronize the timings of the rotation of the two rotary deflectors with a suitable accuracy. This causes some distortion in the reproduced image to be produced by the above optical scanning apparatus at connecting portions between the two halves of each main scanning line.

As disclosed in Japanese Laid-Open Patent Application No.8-72308, there has been proposed an LD optical scanning apparatus that is adapted to eliminate the above problem. The optical scanning apparatus of this type employs a combination of two optical writing modules and a synchronizing mechanism. The synchronizing mechanism is provided for synchronizing the timings of the rotation of the two rotary deflectors in the writing modules. The two rotary deflectors are synchronously rotated by the mechanism when scanning the image surface along the same scanning line. However, because of the use of multiple laser beams deflected by the two rotary deflectors, it is difficult to improve the image quality at connecting portions between the two halves of each main scanning line in the image created by the above optical scanning apparatus. Further, the above optical scanning apparatus requires the synchronizing mechanism which will make the entire system configuration bulky and expensive.

SUMMARY OF THE INVENTION

In order to overcome the problems described above, preferred embodiments of the present invention provide an improved optical scanning apparatus which is configured in a compact, simple and inexpensive structure and ensures good image quality at the connecting portions between the halves of each main scanning line while producing a large-size image on an image surface of a photoconductive medium.

The above-mentioned objects of the present invention are achieved by an optical scanning apparatus which scans an image surface of a photoconductive medium along a main scanning line by focusing and deflecting a light beam onto the image surface, so as to produce an electrostatic image on the image surface, the optical scanning apparatus including: a plurality of light sources which emit first and second beams; first and second coupling lens units which respectively couple the first and second beams emitted by the plurality of light sources; a rotary deflector, having pairs of mutually-opposite reflection surfaces, which deflects the first beam, coupled by the first coupling lens unit, in a first direction by one of the reflection surfaces, and deflects the second beam, coupled by the second coupling lens unit, in a second direction opposite to the first direction, by another of the reflection surfaces; and first and second imaging units which scan the image surface along a first half of the main scanning line by focusing and deflecting the first beam, deflected by the rotary deflector, into a first spot on the image surface, and scan the image surface along a second half of the main scanning line by focusing and deflecting the second beam, deflected by the rotary deflector, into a second spot on the image surface, such that the first and second halves form a substantially straight scanning line on the image surface.

According to one aspect of the present invention, the optical scanning apparatus includes only a single rotary deflector which is shared by the first and second imaging units in order to scan the image surface of the photoconductive medium along one of the first and second halves of the main scanning line by focusing and deflecting the light beam, deflected by the rotary deflector, into a spot on the image surface. The first and second halves of the main scanning line by the first and second imaging units form a substantially straight scanning line with no discontinuity on the image surface when the rotary deflector is rotated. The optical scanning apparatus of the present invention is effective in ensuring good image quality at connecting portions between the halves of each main scanning line while producing a large-size image on the image surface of the photoconductive medium. As the present invention does not require a mechanism which synchronizes the timings of the rotation of plural rotary deflectors required by a conventional optical scanning apparatus, it is possible that the optical scanning apparatus of the present invention be configured in a compact, simple and inexpensive structure.

The above-mentioned objects of the present invention are achieved by an optical scanning apparatus which scans an image surface of a photoconductive medium along a main scanning line by focusing and deflecting a light beam onto the image surface, so as to produce an electrostatic image on the image surface, the optical scanning apparatus including: a plurality of light sources which emit first and second beams; first and second coupling lens units which respectively couple the first and second beams emitted by the plurality of light sources; a rotary deflector, having pairs of mutually-opposite reflection surfaces, which deflects the first beam, coupled by the first coupling lens unit, in a first direction by one of the reflection surfaces, and deflects the second beam, coupled by the second coupling lens unit, in a second direction opposite to the first direction, by another of the reflection surfaces; first and second imaging units which scan the image surface along a first half of the main scanning line by focusing and deflecting the first beam, deflected by the rotary deflector, onto the image surface, and scan the image surface along a second half of the main scanning line by focusing and deflecting the second beam, deflected by the rotary deflector, onto the image surface, wherein the first imaging unit includes a first optical axis and a first sub-deflector, and the second imaging unit includes a second optical axis and a second sub-deflector; a beam sync detection unit which detects both a position of start of the first half of the main scanning line in a sub-scanning direction and a position of start of the second half of the main scanning line in the sub-scanning direction; and a beam-scan position control unit which controls a quantity of rotation of one of the first and second sub-deflectors with respect to the sub-scanning direction based on the detected positions output from the beam sync detection unit, such that the first and second halves form a substantially straight scanning line on the image surface when the rotary deflector is rotated.

According to another aspect of the present invention, the optical scanning apparatus includes only a single rotary deflector which is shared by the first and second imaging units in order to linearly scan the image surface of the photoconductive medium. The beam sync detection unit detects both a position of start of the first half of the main scanning line in the sub-scanning direction and a position of start of the second half of the main scanning line in the sub-scanning direction. The beam-scan position control unit controls a quantity of rotation of one of the first and second sub-deflectors with respect to the sub-scanning direction based on the detected positions output from the beam sync detection unit, such that the first and second halves form a substantially straight scanning line with no discontinuity on the image surface. The optical scanning apparatus of the present invention is more effective in ensuring good image quality at the connecting portions between the halves of each main scanning line when producing a large-size image on the image surface of the photoconductive medium. As the present invention does not require a mechanism which synchronizes the timings of the rotation of plural rotary deflectors required by a conventional optical scanning apparatus, it is possible that the optical scanning apparatus of the present invention be configured in a compact, simple and inexpensive structure.

BRIEF DESCRIPTION OF THE DRAWINGS

Other objects, features and advantages of the present invention will become more apparent from the following detailed description when read in conjunction with the accompanying drawings in which:

FIG. 13A, FIG. 13B and FIG. 13C are diagrams for explaining optical paths of first and second beams in the optical scanning apparatus of FIG. 12;

DETAILED DESCRIPTION OF THE PREFERRED EMBODIMENTS

A description will now be given of the preferred embodiments of the optical scanning apparatus of the invention with reference to the accompanying drawings.

Figure 1:
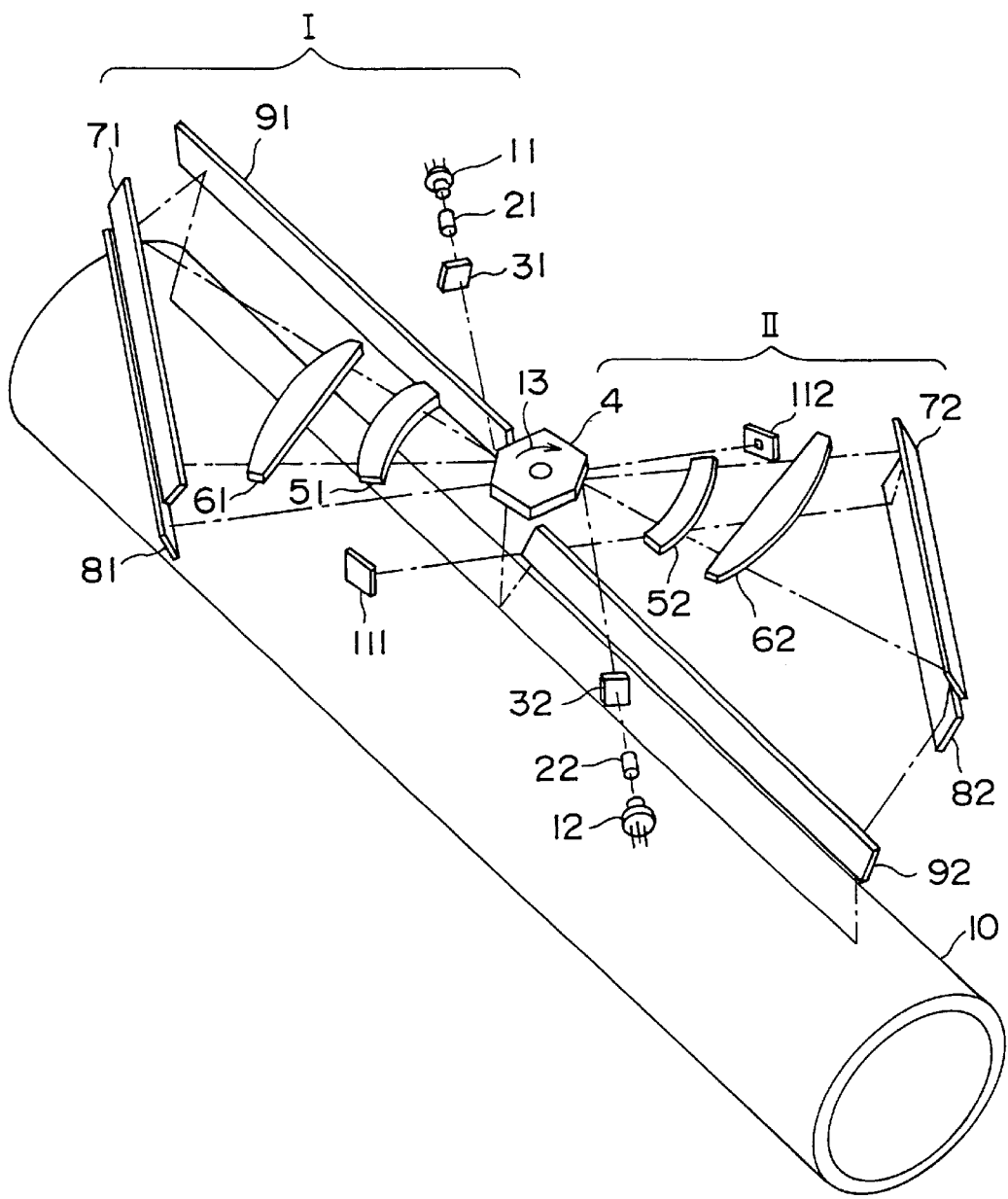
FIG. 1 is a perspective view of a first preferred embodiment of the optical scanning apparatus of the invention.

FIG. 1 is a perspective view of a first preferred embodiment of the optical scanning apparatus of the invention. Specifically, the optical scanning apparatus of the present embodiment is applied to an optical writing module of a digital copier.

As shown in FIG. 1, the optical scanning apparatus of the present embodiment generally includes three basic modules: a rotary deflector 4, a first optical writing module I and a second optical writing module II. The optical scanning apparatus of the present embodiment is adapted to produce a large-size image on an image surface of a photoconductive medium and improve the image quality at connecting portions between two halves of each main scanning line, as described below.

The optical scanning apparatus of FIG. 1 scans an electrostatically-charged image surface of a photoconductive medium 10 along a main scanning line by focusing and deflecting a light beam onto the image surface, so as to produce an electrostatic image on the image surface. In the present embodiment, the photoconductive medium 10 is comprised of a rotary photoconductive drum. In the optical scanning apparatus of FIG. 1, a first light source 11 (for example, a laser diode LD) emits a first beam, and a second light source 12 (for example, a laser diode LD) emits a second beam. The rotary deflector 4 is comprised of a rotary polygonal mirror which has three pairs of mutually-opposite reflection surfaces. The rotary deflector 4 includes a rotating axis, and the rotary deflector 4 is rotated about the rotating axis by a motor (not shown), as indicated by the arrow 13 in FIG. 1, during operation. The rotary deflector 4 deflects the first beam, coupled by the first optical writing module I, in a first direction by one of the mutually opposite reflection surfaces of one pair in the rotary deflector 4, and deflects the second beam, coupled by the second optical writing module II, in a second direction opposite to the first direction, by the other of the mutually opposite reflection surfaces of that pair of the rotary deflector 4.

In the optical scanning apparatus of FIG. 1, the first light source 11 is driven by a laser diode (LD) driver (not shown) to emit the first beam which is modulated in accordance with an image signal, and the second light source 12 is driven by the same laser diode driver to emit the second beam which is modulated in accordance with the image signal.

In the optical scanning apparatus of FIG. 1, the first optical writing module I includes the first light source 11, a collimator lens 21 and a cylindrical lens 31. The collimator lens 21 couples the first beam from the first light source 11, and the cylindrical lens 31 converts the first beam coupled by the collimator lens 21, into a converging beam. The converging first beam from the cylindrical lens 31 is directed to one of the reflection surfaces of the rotary deflector 4. The first optical writing module I further includes a line-imaging unit and a sub-deflector. The line-imaging unit of the first optical writing module I is comprised of, for example, a first fθ lens 51 and a second fθ lens 61. The sub-deflector of the first optical writing module I is comprised of, for example, a first mirror 71, a second mirror 81 and a third mirror 91. When the rotary deflector 4 is rotated, the line-imaging unit and the sub-deflector in the first optical writing module I act to scan the image surface of the photoconductive medium 10 at a substantially uniform scanning rate along a first half (or the left-side half in FIG. 1) of the main scanning line by focusing and deflecting the first beam, deflected by the rotary deflector 4, into a first spot on the image surface. The first beam is finally deflected by the third mirror 91 onto the image surface of the photoconductive medium 10.

In the optical scanning apparatus of FIG. 1, the second optical writing module II is configured in a manner identical to that of the first optical writing module I described above. The second optical writing module II includes the second light source 12, a collimator lens 22 and a cylindrical lens 32. The collimator lens 22 couples the second beam from the second light source 12, and the cylindrical lens 32 converts the second beam coupled by the collimator lens 22, into a converging beam. The converging second beam from the cylindrical lens 32 is directed to the 180° opposite one of the reflection surfaces of the rotary deflector 4. The second optical writing module II further includes a line-imaging unit and a sub-deflector. The line-imaging unit of the second optical writing module II is comprised of, for example, a first fθ lens 52 and a second fθ lens 62. The sub-deflector of the second optical writing module II is comprised of, for example, a first mirror 72, a second mirror 82 and a third mirror 92. When the rotary deflector 4 is rotated, the line-imaging unit and the sub-deflector in the second optical writing module II act to scan the image surface of the photoconductive medium 10 at a substantially uniform scanning rate along a second half (or the right-side half in FIG. 1) of the main scanning line by focusing and deflecting the second beam, deflected by the rotary deflector 4, into a second spot on the image surface. The second beam is finally deflected by the third mirror 92 onto the image surface of the photoconductive medium 10.

In the optical scanning apparatus of FIG. 1, the first and second optical writing modules I and II scan the image surface of the photoconductive medium 10 such that the first and second halves of the main scanning line form a substantially straight scanning line with no discontinuity on the image surface. In the present embodiment, the first and second spots formed by the first and second imaging units are synchronously moved on the image surface of the photoconductive medium 10 from a middle point of the main scanning line in opposite directions when the rotary deflector 4 is rotated.

In the optical scanning apparatus of FIG. 1, a sync detection unit 111 and a sync detection unit 112 are provided. The sync detection unit 111 is provided at a position outside a scanning range of the second optical writing module II, and detects a timing of start of the main scanning every time the main scanning (or the second half) over the photoconductive medium 10 is started by the second optical writing module II. The sync detection unit 112 is provided at a position outside a scanning range of the first optical writing module I, and detects a timing of start of the main scanning every time the main scanning (or the first half) over the photoconductive medium 10 is started by the first optical writing module II. An optical writing control unit (not shown) in the optical scanning apparatus of FIG. 1 acts to synchronize the emission of the first and second beams by the first and second light sources 11 and 12 with the timing" of start of the main scanning by the first and second optical writing modules I and II based on the output signals of the sync detection units 112 and 111.

Figure 2:
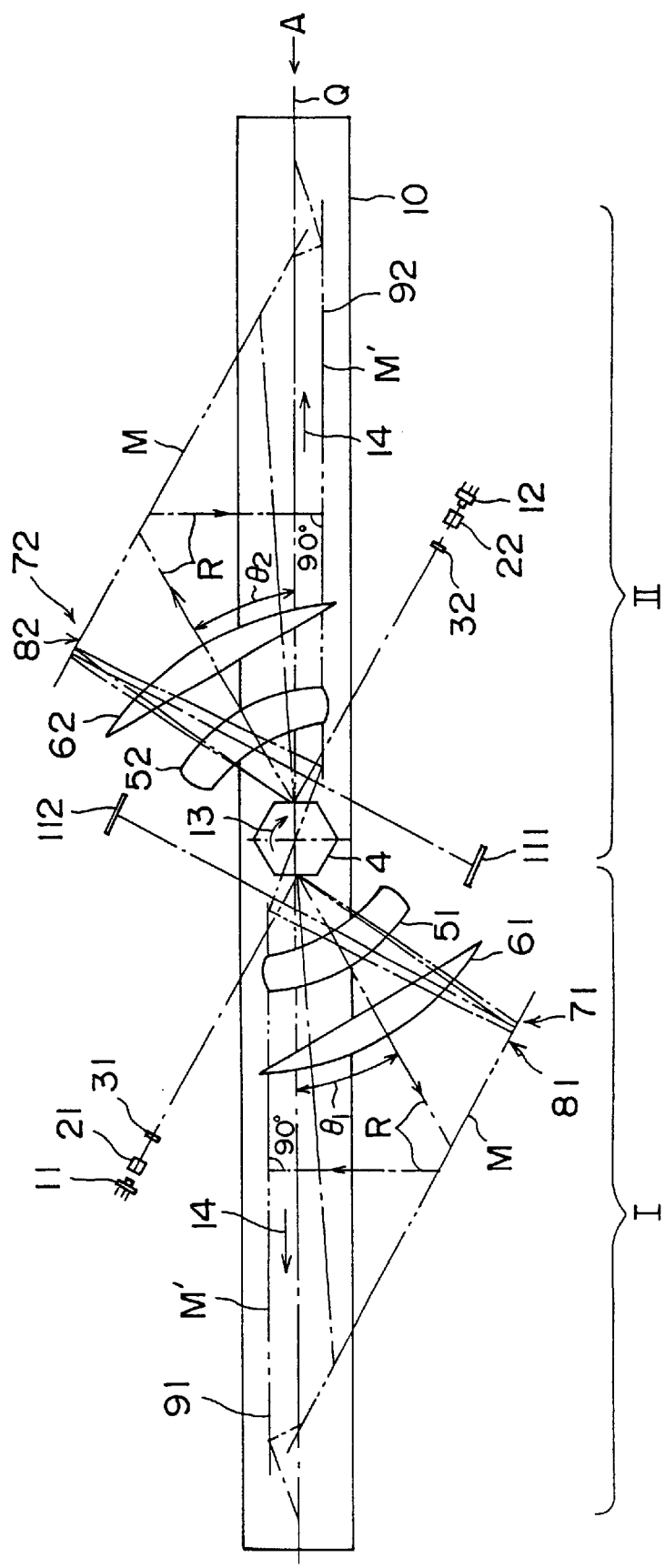
FIG. 2 is a top view of the first preferred embodiment of the optical scanning apparatus of FIG. 1.

FIG. 2 is a top view of the optical scanning apparatus of FIG. 1.

In FIG. 2, the two-dot chain lines "M" denote the position of a reflection surface of the first mirror 71 (or 72) or the second mirror 81 (or 82) where the light beam from the rotary deflector 4 is deflected to the third mirror 91 (or 92). The two-dot chain lines "M'" denote the position of a reflection surface of the third mirror 91 (or 92) where the light beam from the first and second mirrors 71 and 81 (or 72 and 82) is finally deflected by the third mirror 91 (or 92) onto the image surface of the photoconductive medium 10.

In FIG. 2, the one-dot chain line "Q" denotes a longitudinal axial direction of the photoconductive medium 10, and the one-dot chain lines "R" denote an optical path of the first or second beam deflected by the rotary deflector 4 and further deflected by the sub-deflector 71 and 81 (or 72 and 82). The arrow 13 indicates the rotating direction of the rotary deflector 4. The arrows 14 indicate the directions of movement of the first and second spots formed by the first and second imaging units on the image surface of the photoconductive medium 10 when the rotary deflector 4 is rotated.

Figure 3:
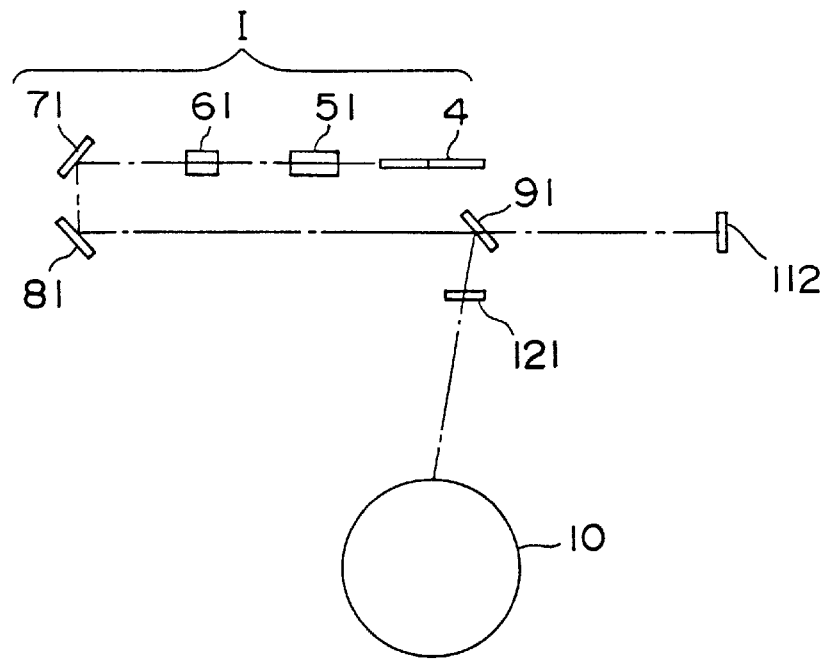
FIG. 3 is a diagram for explaining an optical path of a first beam from a first optical writing module in the optical scanning apparatus of FIG. 2.

FIG. 3 is a side view of the optical scanning apparatus of FIG. 2 when viewed in the direction indicated by the arrow A in FIG. 2. The one-dot chain line of FIG. 3 indicates an optical path of the first beam from the first optical writing module I in the optical scanning apparatus of the present embodiment.

Figure 4:
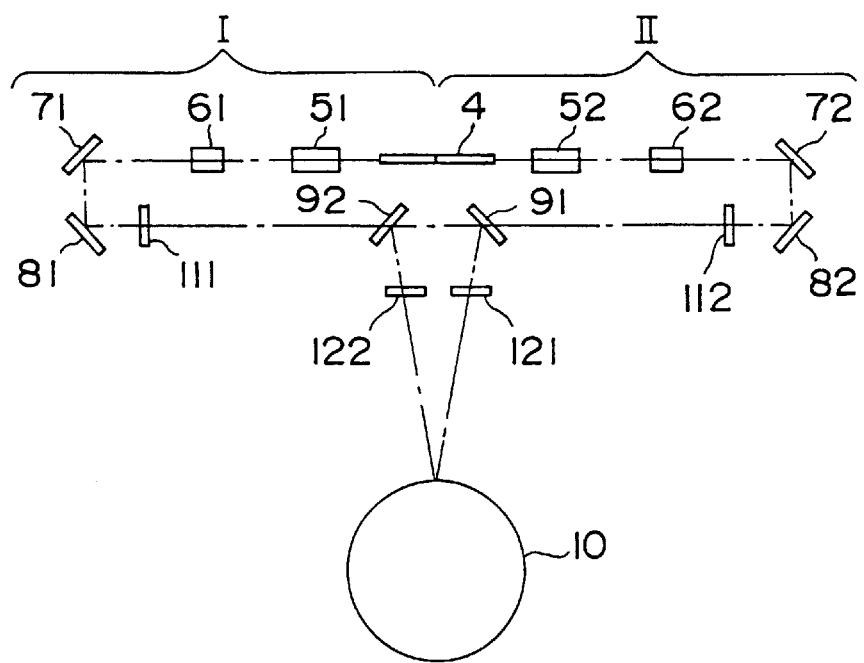
FIG. 4 is a diagram for explaining optical paths of first and second beams from first and second optical writing modules in the optical scanning apparatus of FIG. 2.

FIG. 4 is a side view of the optical scanning apparatus of FIG. 2 when viewed in the direction indicated by the arrow A in FIG. 2. The one-dot chain line of FIG. 4 indicates optical paths of the first and second beams from the first and second optical writing modules I and II in the optical scanning apparatus of the present embodiment.

It is necessary that, in the optical scanning apparatus of the above-described embodiment, the photoconductive medium 10 be enclosed in a dustproof enclosure (not shown). In the dustproof enclosure, appropriate openings are formed at positions where the first and second beams pass through the dustproof enclosure to reach the image surface of the photoconductive medium 10, and glass plates 121 and 122 are attached to the openings of the dustproof enclosure, as shown in FIG. 3 and FIG. 4, in order to protect the photoconductive medium 10 against dust.

In the optical scanning apparatus of the above-described embodiment, a single rotary deflector 4 is shared by the first and second optical writing modules I and II in order to scan the image surface of the photoconductive medium 10 along one of the first and second halves of the main scanning line by focusing and deflecting the light beam, deflected by the rotary deflector 4, into a spot on the image surface. The first and second halves of the main scanning line by the first and second imaging units form a substantially straight scanning line with no discontinuity on the image surface. It is no longer necessary to synchronize the timings of the rotation of plural rotary deflectors as required by a conventional optical scanning apparatus.

The optical scanning apparatus of the present embodiment can easily synchronize the emission of the first and second beams by the first and second light sources 11 and 12 with the timing of start of the main scanning by the first and second optical writing modules I and II. Accordingly, the optical scanning apparatus of the present embodiment is effective in producing a large-size image on the image surface of the photoconductive medium 10 and in improving the image quality at connecting portions between two halves of each main scanning line. As the present embodiment does not require a mechanism that synchronizes the timings of the rotation of plural rotary deflectors required by a conventional optical scanning apparatus, it is possible that the optical scanning apparatus of the present embodiment be configured in a compact, inexpensive structure.

Figure 5:
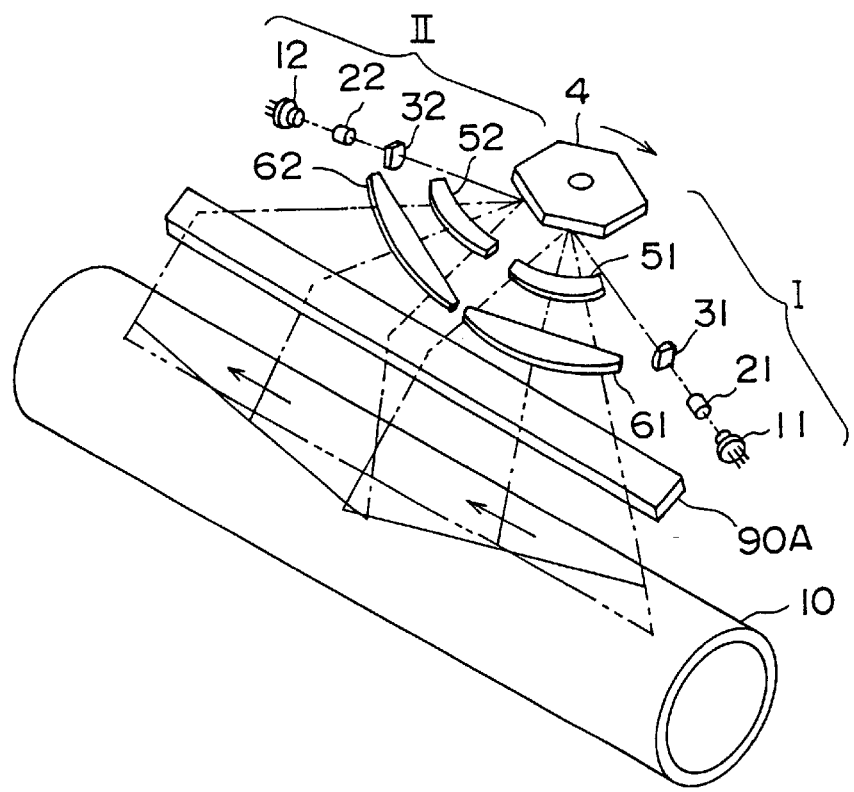
FIG. 5 is a perspective view of a variation of the first preferred embodiment of the optical scanning apparatus.

FIG. 5 is a perspective view of a variation of the first preferred embodiment of the optical scanning apparatus.

As shown in FIG. 5, the optical scanning apparatus of the present embodiment generally includes the rotary deflector 4, a first optical writing module I and a second optical writing module II. The first and second optical writing modules I and II are provided at two adjacent locations on one side of the rotary deflector 4. The first optical writing module I includes the first light source 11, the collimator lens 21, the cylindrical lens 31, the first fθ lens 51, the second fθ lens 61, and a common sub-deflector 90A. The second optical writing module II includes the second light source 12, the collimator lens 22, the cylindrical lens 32, the first fθ lens 52, the second fθ lens 62, and the common sub-deflector 90A. In the present embodiment, the sub-deflector 90A is shared by the first and second optical writing modules I and II. The sub-deflector 90A is, for example, a mirror which deflects the first and second beams onto the image surface of the photoconductive medium 10.

In the present embodiment, the first and second spots formed by the first and second optical writing modules I and II are sequentially moved on the image surface of the photoconductive medium 10 in the same main scanning direction when the rotary deflector 4 is rotated. The first and second halves of the main scanning line by the first and second optical writing modules I and II form a scanning line on the image surface. It is not necessary to synchronize the timings of the rotation of plural rotary deflectors as required by a conventional optical scanning apparatus. However, it is technically difficult to control the timings of the emission of the first and second light sources 11 and 12 such that the start of the second half of the main scanning line by the second beam emitted by the second light source 12 immediately follows the end of the first half of the main scanning line by the first beam emitted by the first light source 11.

In the optical scanning apparatus of FIG. 5, it is necessary that the sub-deflector 90A shared by the two optical writing modules I and II extends in a direction parallel to the axial direction of the photoconductive medium 10. However, even if the sub-deflector 90A is arranged with high accuracy in the direction parallel to the axial direction of the photoconductive medium 10, the diameter of the first and second spots on the image surface significantly varies along the main scanning line. It is difficult that the first and second halves of the main scanning line form a substantially straight scanning line with no discontinuity on the image surface of the photoconductive medium 10. Some distortion in the image at the connecting portions between halves of each main scanning line may be produced due to the use of the common sub-deflector 90A.

Figure 6:
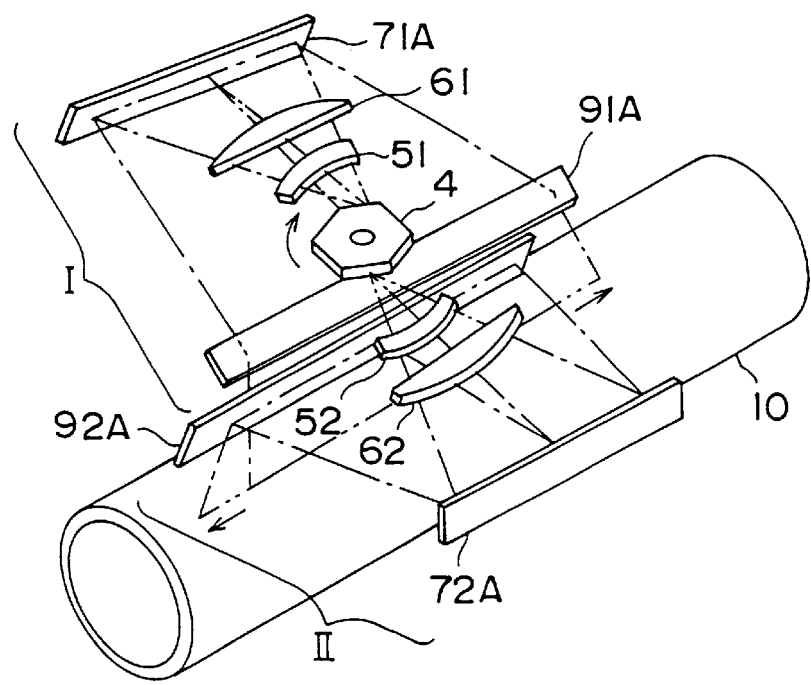
FIG. 6 is a perspective view of another variation of the first preferred embodiment of the optical scanning apparatus.

FIG. 6 is a perspective view of another variation of the first preferred embodiment of the optical scanning apparatus.

As shown in FIG. 6, the optical scanning apparatus of the present embodiment generally includes the rotary deflector 4, a first optical writing module I and a second optical writing module II. The first and second optical writing modules I and II are provided on the opposite sides of the rotary deflector 4, and the writing modules I and II are arranged such that the optical axis of each of the line-imaging units thereof is substantially perpendicular to the axial direction of the photoconductive medium 10. The first optical writing module I includes the first light source 11, the collimator lens 21, the cylindrical lens 31, the first fθ lens 51, the second fθ lens 61, a first sub-deflector 71A, and a second sub-deflector 91A. The second optical writing module II includes the second light source 12, the collimator lens 22, the cylindrical lens 32, the first fθ lens 52, the second fθ lens 62, a first sub-deflector 72A, and a second sub-deflector 92A. In the present embodiment, the first and second sub-deflectors 71A, 72A, 91A and 92A are separately provided for the first and second optical writing modules I and II. The first sub-deflectors 71A and 72A are, for example, mirrors which deflect the first and second beams from the rotary deflector 4 to the second sub-deflector 91A (or 92A). The second sub-deflectors 91A and 92A are, for example, mirrors which deflect the first and second beams onto the image surface of the photoconductive medium 10.

In the present embodiment, the first and second spots formed by the first and second optical writing modules I and II are synchronously moved on the image surface from a middle point of the main scanning line in opposite directions when the rotary deflector 4 is rotated. The first and second halves of the main scanning line by the first and second optical writing modules I and II form a substantially straight scanning line with no discontinuity on" the image surface. It is not necessary to synchronize the timings of the rotation of plural rotary deflectors as required by a conventional optical scanning apparatus.

In the optical scanning apparatus of FIG. 6, it is possible that the first and second halves of the main scanning line form a substantially straight scanning line with no discontinuity on the image surface of the photoconductive medium 10. Because of the first and second sub-deflectors 71A, 72A, 91A and 92A, it is possible to prevent some distortion in the image at the connecting portions between halves of each main scanning line from being produced. However, in the embodiment of FIG. 6, the optical axis of each of the line-imaging units 51, 52, 61 and 62 is arranged so as to be substantially perpendicular to the axial direction of the photoconductive medium 10. It is difficult to enlarge the effective scanning range of the photoconductive medium 10 to a maximum range.

Figure 7:
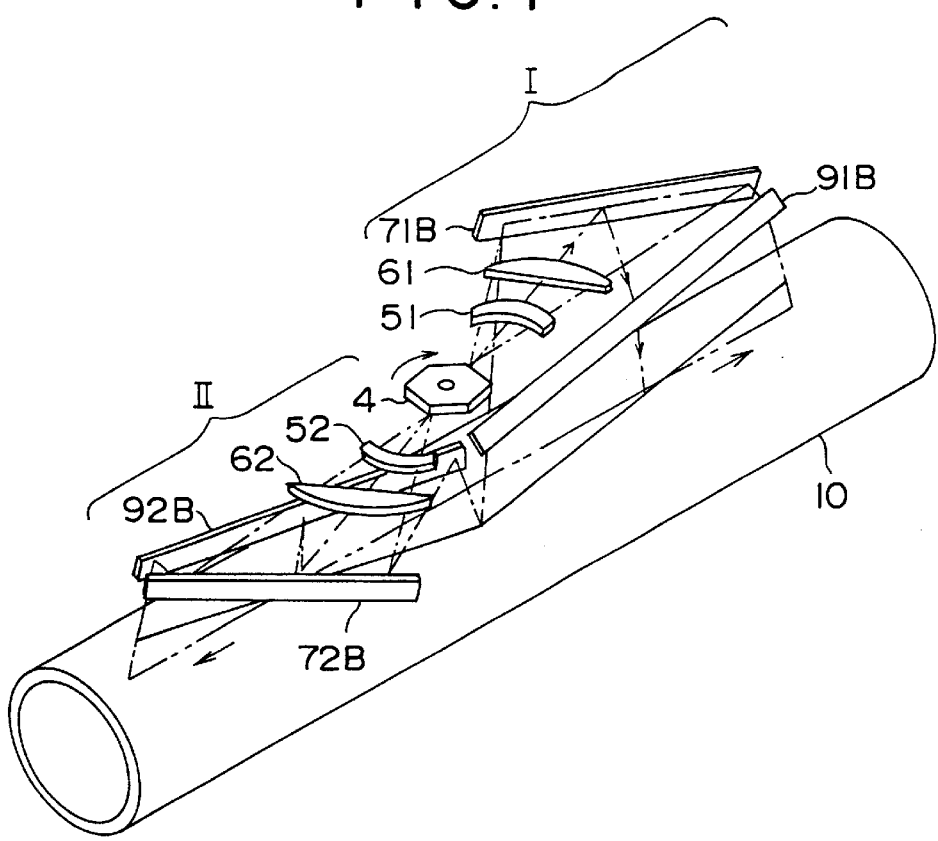
FIG. 7 is a perspective view of another variation of the first preferred embodiment of the optical scanning apparatus.

FIG. 7 is a perspective view of another variation of the first preferred embodiment of the optical scanning apparatus.

As shown in FIG. 7, the optical scanning apparatus of the present embodiment generally includes the rotary deflector 4, a first optical writing module I and a second optical writing module II. The first and second optical writing modules I and II are provided on the opposite sides of the rotary deflector 4, and the writing modules I and II are arranged such that the optical axis of each of the line-imaging units thereof is slanted with respect to the axial direction of the photoconductive medium 10. The first optical writing module I includes the first light source 11, the collimator lens 21, the cylindrical lens 31, the first fθ lens 51, the second fθ lens 61, a first sub-deflector 71B, and a second sub-deflector 91B. The elements 11, 21 and 31 which are essentially the same as corresponding elements in FIG. 1 are not shown in FIG. 7. The second optical writing module II includes the second light source 12, the collimator lens 22, the cylindrical lens 32, the first fθ lens 52, the second fθ lens 62, a first sub-deflector 72B, and a second sub-deflector 92B. The elements 12, 22 and 32 which are essentially the same as corresponding elements in FIG. 1 are not shown in FIG. 7.

In the embodiment of FIG. 7, the first and second sub-deflectors 71B, 72B, 91B and 92B are separately provided for the first and second optical writing modules I and II, and arranged so that the first and second sub-deflectors 71B, 72B, 91B and 92B are slanted to the axial direction of the photoconductive medium 10 as shown in FIG. 7. Hence, the main scanning line made by the laser beam from each of the second sub-deflectors 91B and 92B is made parallel to the axial direction of the photoconductive medium 10. It is possible for the optical scanning apparatus of FIG. 7 to enlarge the effective scanning range on the photoconductive medium 10 from effective scanning range of the embodiment of FIG. 6 to a maximum width. The first sub-deflectors 71B and 72B are, for example, mirrors which deflect the first and second beams from the rotary deflector 4 to the second sub-deflector 91B (or 92B). The second sub-deflectors 91B and 92B are, for example, mirrors which deflect the first and second beams onto the image surface of the photoconductive medium 10.

In the embodiment of FIG. 7, the first and second spots formed by the first and second optical writing modules I and II are synchronously moved on the image surface from a middle point of the main scanning line in opposite directions when the rotary deflector 4 is rotated. The first and second halves of the main scanning line by the first and second optical writing modules I and II form a scanning line on the image surface. It is not necessary to synchronize the timings of the rotation of plural rotary deflectors as required by a conventional optical scanning apparatus.

Similar to the embodiment of FIG. 5, the optical scanning apparatus of FIG. 7 has the problem in that the diameter of the first and second spots on the image surface significantly varies along the main scanning line. It is difficult that the first and second halves of the main scanning line form a substantially straight scanning line with no discontinuity on the image surface of the photoconductive medium 10. Some distortion in the image at the connecting portions between halves of each main scanning line may be produced due to the use of the first and second sub-deflectors 71B, 72B, 91B and 92B.

As described above, in the cases of the optical scanning apparatuses of FIG. 5 through FIG. 7, some difficulties in improving the image quality at connecting portions between two halves of each main scanning line may arise.

Referring back to FIG. 1, the first preferred embodiment of the optical scanning apparatus is configured such that the first and second spots formed by the first and second optical writing modules I and II are synchronously moved on the image surface of the photoconductive medium 10 from the middle point of the main scanning line in opposite directions when the rotary deflector 4 is rotated. It is possible for the optical scanning apparatus of the first preferred embodiment to easily synchronize the emission of the first and second beams by the first and second light sources 11 and 12 with the timing of start of the main scanning by the first and second optical writing modules I and II. Further, it is possible for the optical scanning apparatus of the first preferred embodiment to improve the image quality at connecting portions between two halves of each main scanning line.

It should be noted that, in order to achieve the above-mentioned results, the optical scanning apparatus of the first preferred embodiment is configured such that a first optical axis of the line-imaging unit (or the elements 51 and 61) is at an angle θ1 to the axial direction (indicated by the one-dot chain line Q) of the photoconductive medium 10 where 0°<|θ1|<90°, a second optical axis of the line-imaging unit (or the elements 52 and 62) is at an angle θ2 to the axial direction of the photoconductive medium 10 where 0°<|θ2|<90°, and the first and second sub-deflectors (or the elements 71, 72, 81, 82, 91 and 92) are configured such that the first and second beams deflected by the first and second sub-deflectors are incident to the image surface of the photoconductive medium 10 at 90°. See FIG. 2 for the configuration of the first preferred embodiment.

Figure 8:
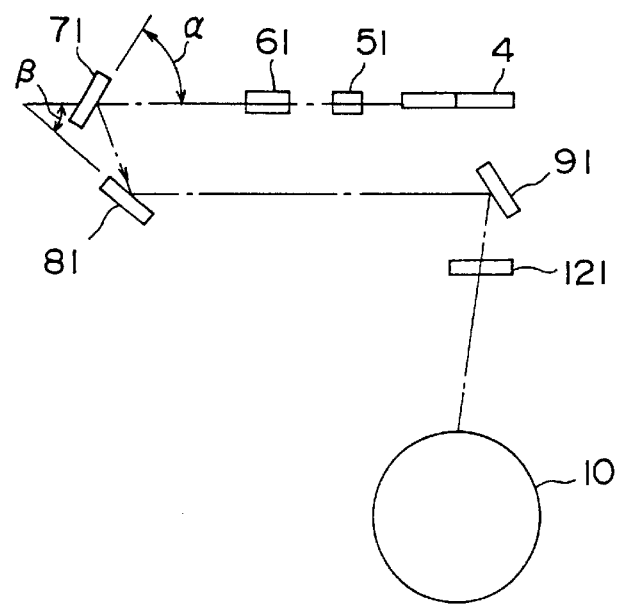
FIG. 8 is a diagram for explaining a positional relationship between a rotary deflector, a sub-deflector and an image surface of a photoconductive drum in the first preferred embodiment of the optical scanning apparatus.

FIG. 8 is a diagram for explaining the positional relationship between the rotary deflector 4, the sub-deflector unit and the scanned image surface of the photoconductive drum 10 in the first preferred embodiment of the optical scanning apparatus. For the sake of simplicity of description, only the elements of the first optical writing module I are shown in FIG. 8 and the elements of the second optical writing module II are omitted.

It should be noted that, in order to achieve the above-mentioned results, the optical scanning apparatus of the first preferred embodiment is configured such that the first mirror 71 (or 72) is at an angle α to a plane that is perpendicular to the rotating axis of the rotary deflector 4 and parallel to the scanning line, the second mirror 81 (or 82) is at an angle β to the above plane, and the first and second mirrors 71, 72, 81 and 82 of each of the imaging units are configured to meet the condition |α−β|=90°. According to the above configuration, the first preferred embodiment of the optical scanning apparatus can easily synchronize the emission of the first and second beams by the first and second light sources 11 and 12 with the timing of start of the main scanning by the first and second optical writing modules I and II, and can improve the image quality at connecting portions between two halves of each main scanning line. See FIG. 8 for the configuration of the first preferred embodiment.

Figure 9:
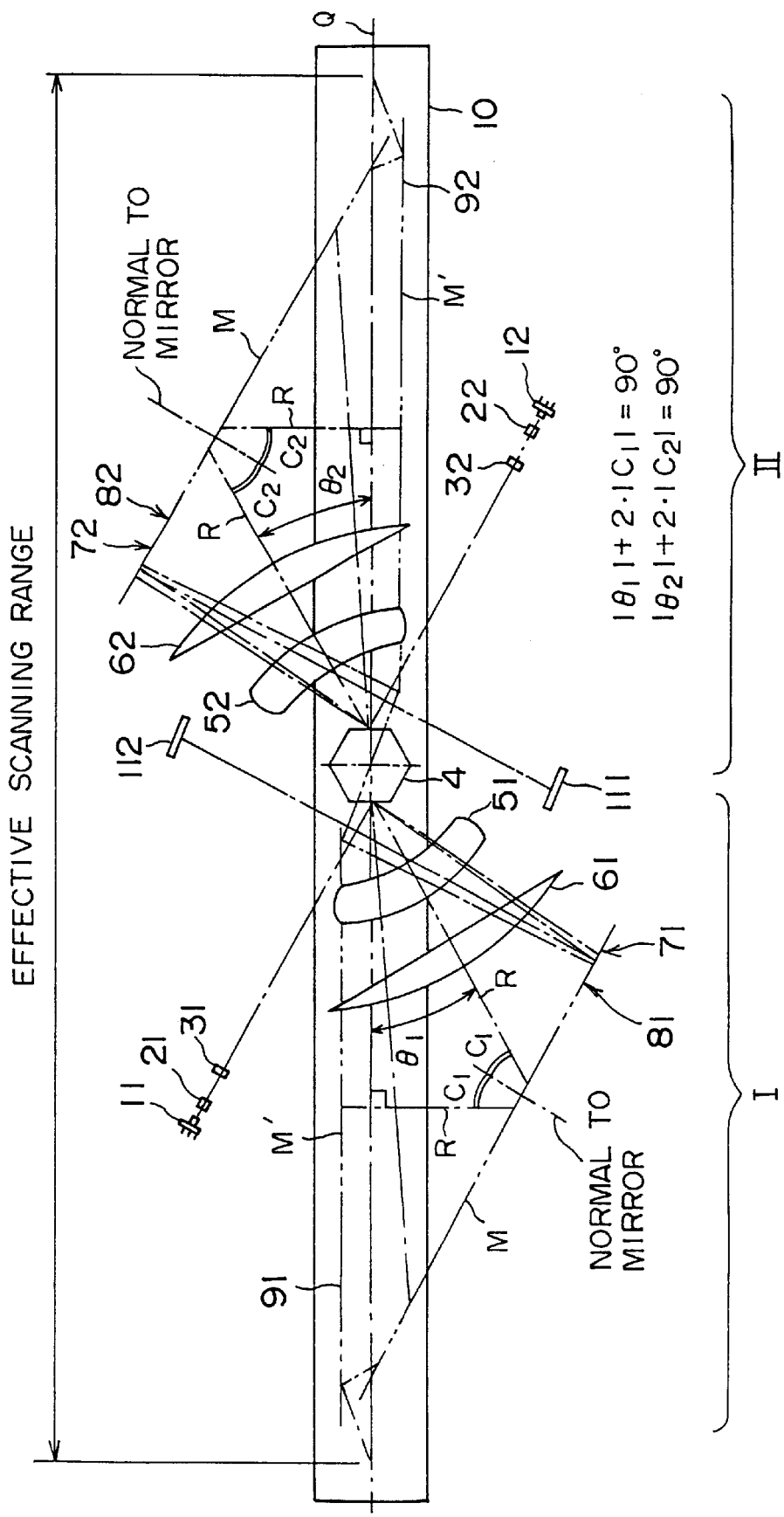
FIG. 9 is a diagram for explaining a positional relationship between a line-imaging unit, a sub-deflector and the image surface in the first preferred embodiment of the optical scanning apparatus.

FIG. 9 shows a positional relationship between the line-imaging unit, the sub-deflector and the image surface in the first preferred embodiment of the optical scanning apparatus. In FIG. 9, there is shown the positional relationship when the angle θ1 between the optical axis of the line-imaging unit in the first optical writing module I and the axial direction of the photoconductive medium 10 is nearly equal to the angle θ2 between the optical axis of the line-imaging unit in the second optical writing module II and the axial direction of the photoconductive medium 10 (θ1=θ2).

Figure 10:
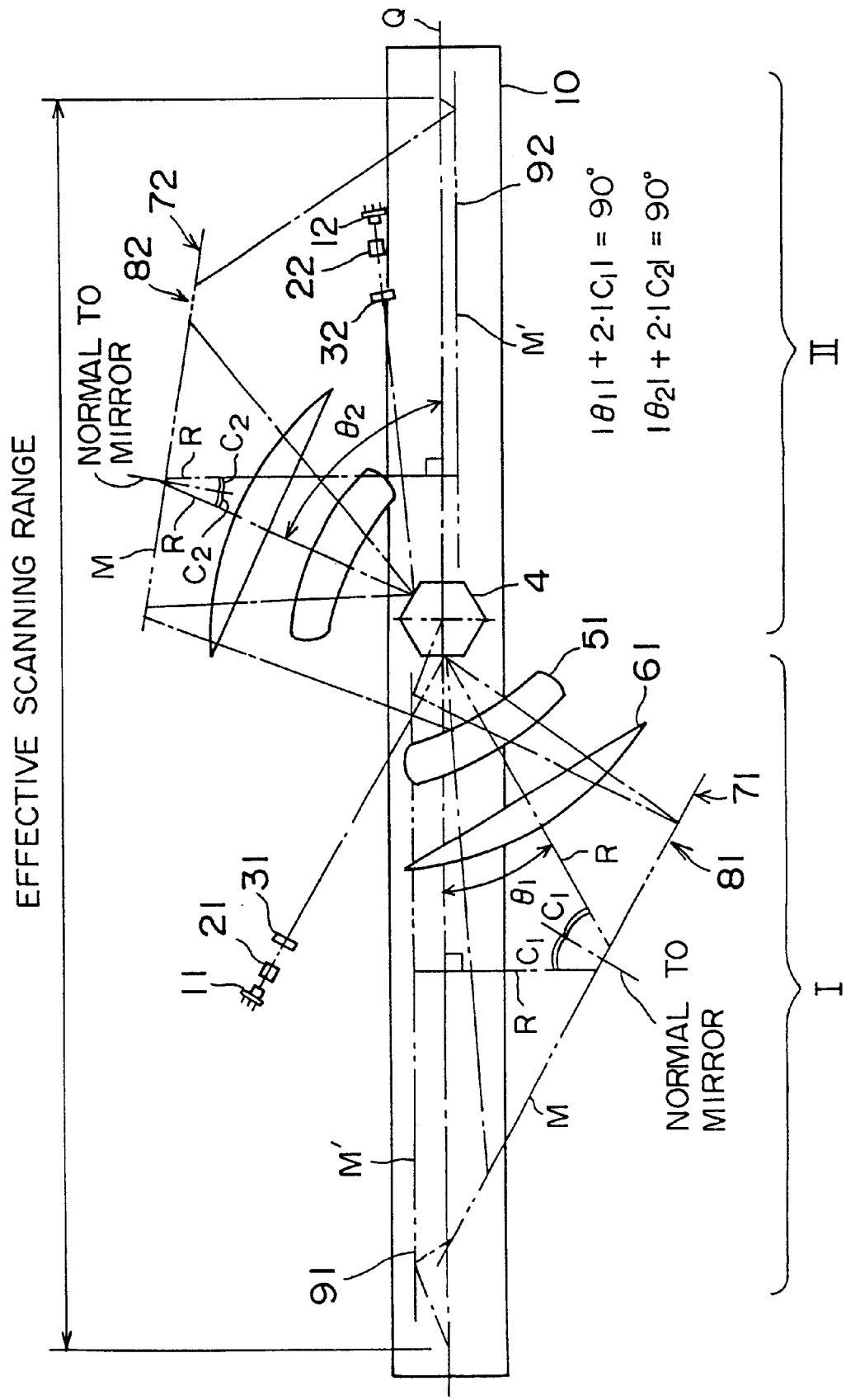
FIG. 10 is a diagram for explaining a positional relationship between the line-imaging unit, the sub-deflector and the image surface in the first preferred embodiment of the optical scanning apparatus.

FIG. 10 shows a positional relationship between the sub-deflector and the image surface in the first preferred embodiment of the optical scanning apparatus. In FIG. 10, there is shown another positional relationship when the angle θ1 is significantly different from the angle θ2 (θ1<θ2).

As shown in FIG. 9 and FIG. 10, the optical axis of the line-imaging unit (or the elements 51 and 61) of the first optical writing module I is at the angle θ1 to the axial direction of the photoconductive medium 10 where 0°<|θ1|<90°, and the optical axis of the line-imaging unit (or the elements 52 and 62) of the second optical writing module II is at the angle θ2 to the axial direction of the photoconductive medium 10 where 0°<|θ2|<90°. The sub-deflectors (or the elements 71, 72, 81, 82, 91 and 92) of the first and second optical writing modules I and II are configured such that the first and second beams deflected by the first and second sub-deflectors are incident to the image surface at 90°.

In the first preferred embodiment of the optical scanning apparatus, the first beam deflected by the rotary deflector 4 along the optical axis of the line-imaging unit (the elements 51 and 61) is incident to the sub-deflector (the elements 71, 81 and 91) at an incidence angle C1, and the second beam deflected by the rotary deflector 4 along the optical axis of the line-imaging unit (the elements 52 and 62) is incident to the sub-deflector (the elements 72, 82 and 92) at an incidence angle C2. It should be noted that, in order to achieve the above-mentioned results, the first and second optical writing modules I and II in the first preferred embodiment are configured to meet the conditions: |θ1|+2°|C1|=90° and |θ2|+2°|C2|=90°. Accordingly, the optical scanning apparatus of the present embodiment is effective in producing a large-size image on the image surface of the photoconductive medium 10 and in improving the image quality at connecting portions between two halves of each main scanning line.

In the example shown in FIG. 9, the angle θ1 is nearly equal to the angle θ2. The scanning range of the first optical writing module I over the photoconductive medium 10 can be easily made substantially identical to the scanning range of the second optical writing module II over the photoconductive medium 10.

In the example shown in FIG. 10, the angle θ1 is quite different from the angle θ2 (θ1<θ2). This results in the scanning range of the first optical writing module I over the photoconductive medium 10 which is larger than the scanning range of the second optical writing module II over the photoconductive medium 10. However, this will be negligible in improving the image quality at connecting portions between two halves of each main scanning line. Even in the example of FIG. 10, the first and second optical writing modules I and II in the first preferred embodiment are configured to meet the conditions: |θ1|+2°|C1|=90° and |θ2|+2°|C2|=90°, and therefore the optical scanning apparatus of the first preferred embodiment is effective in producing a large-size image on the image surface of the photoconductive medium 10 and in improving the image quality at connecting portions between two halves of each main scanning line.

Next, a description will be given of a second preferred embodiment of the optical scanning apparatus with reference to FIG. 11A through FIG. 15.

Figure 12:
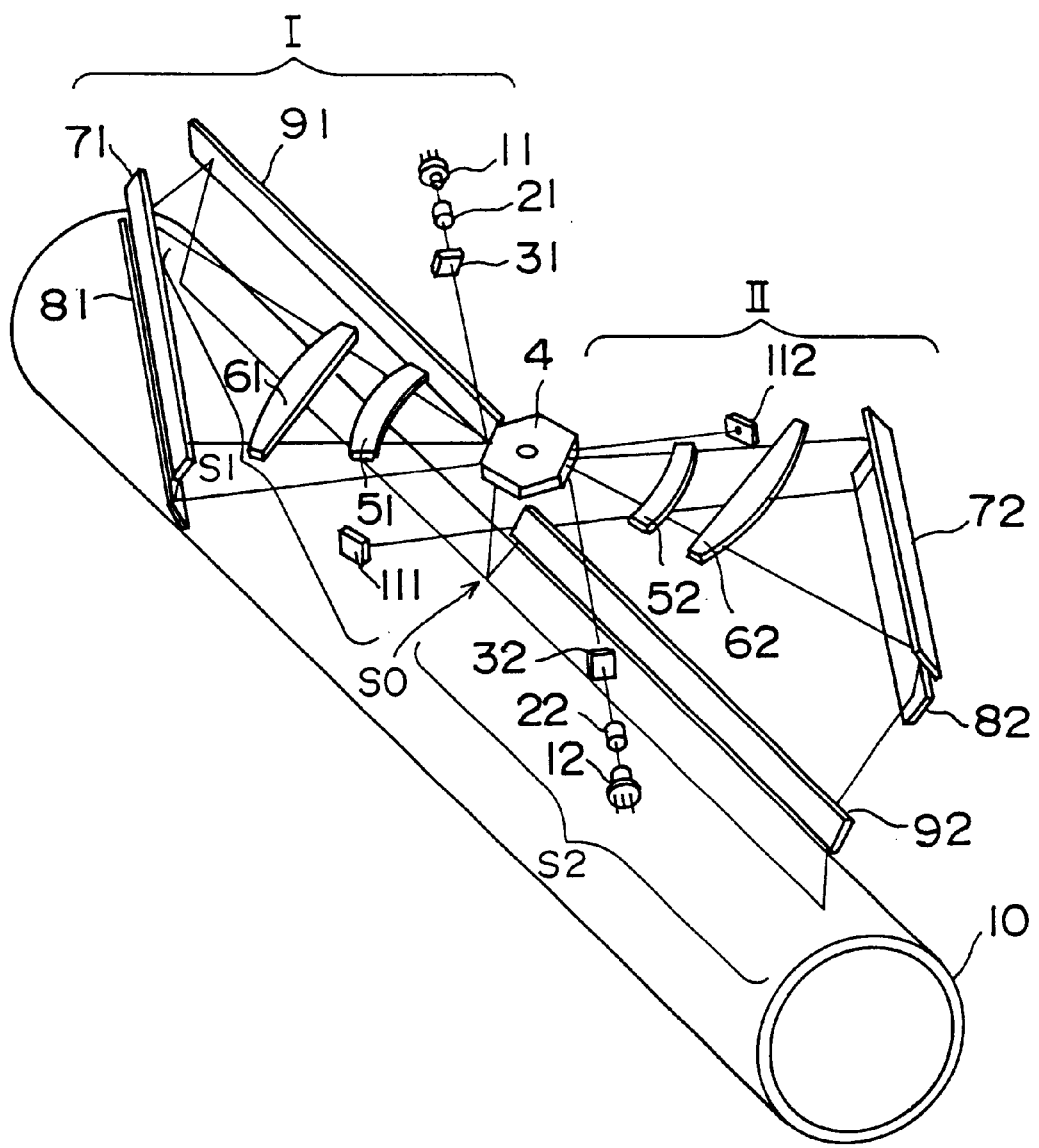
FIG. 12 is a diagram for explaining a configuration of the second preferred embodiment of the optical scanning apparatus.

FIG. 12 shows a basic configuration of the second preferred embodiment of the optical scanning apparatus. As shown in FIG. 12, the optical scanning apparatus of the present embodiment generally includes a rotary deflector 4, a first optical writing module I and a second optical writing module II. Similar to the first preferred embodiment described above, the optical scanning apparatus of the present embodiment is adapted to produce a large-size image on an image surface of a photoconductive medium and improve the image quality at connecting portions between two halves of each main scanning line.

The optical scanning apparatus of FIG. 12 scans an electrostatically-charged image surface of a photoconductive medium 10 along a main scanning line by focusing and deflecting a light beam onto the image surface, so as to produce an electrostatic image on the image surface. In the present embodiment, the photoconductive medium 10 is comprised of a rotary photoconductive drum. In the optical scanning apparatus of FIG. 12, a first light source 11 (for example, a laser diode LD) emits a first beam, and a second light source 12 (for example, a laser diode LD) emits a second beam. The rotary deflector 4 is comprised of a rotary polygonal mirror which has three pairs of mutually-opposite reflection surfaces. The rotary deflector 4 includes a rotating axis, and the rotary deflector 4 is rotated about the rotating axis by a motor (not shown) during operation. The rotary deflector 4 deflects the first beam, coupled by the first optical writing module I, in a first direction by one of the mutually opposite reflection surfaces of one pair in the rotary deflector 4, and deflects the second beam, coupled by the second optical writing module II, in a second direction opposite to the first direction, by the other of the mutually opposite reflection surfaces of that pair of the rotary deflector 4.

In the optical scanning apparatus of FIG. 12, the first light source 11 is driven by a laser diode (LD) driver (not shown) to emit the first beam which is modulated in accordance with an image signal, and the second light source 12 is driven by the same laser diode driver to emit the second beam which is modulated in accordance with the image signal.

In the optical scanning apparatus of FIG. 12, the first optical writing module I includes the first light source 11, a collimator lens 21 and a cylindrical lens 31. The collimator lens 21 couples the first beam from the first light source 11, and the cylindrical lens 31 converts the first beam coupled by the collimator lens 21, into a converging beam. The converging first beam from the cylindrical lens 31 is directed to one of the reflection surfaces of the rotary deflector 4. The first optical writing module I further includes a line-imaging unit and a sub-deflector. The line-imaging unit of the first optical writing module I is comprised of, for example, a first fθ lens 51 and a second fθ lens 61. The sub-deflector of the first optical writing module I is comprised of, for example, a first mirror 71, a second mirror 81 and a third mirror 91. When the rotary deflector 4 is rotated, the line-imaging unit and the sub-deflector in the first optical writing module I act to scan the image surface of the photoconductive medium 10 at a substantially uniform scanning rate along a first half S1 (or the left-side half in FIG. 12) of the main scanning line by focusing and deflecting the first beam, deflected by the rotary deflector 4, into a first spot on the image surface. The first beam is finally deflected by the third mirror 91 onto the image surface of the photoconductive medium 10.

In the optical scanning apparatus of FIG. 12, the second optical writing module II is configured in a manner identical to that of the first optical writing module I described above. The second optical writing module II includes the second light source 12, a collimator lens 22 and a cylindrical lens 32. The collimator lens 22 couples the second beam from the second light source 12, and the cylindrical lens 32 converts the second beam coupled by the collimator lens 22, into a converging beam. The converging second beam from the cylindrical lens 32 is directed to the 180° opposite one of the reflection surfaces of the rotary deflector 4. The second optical writing module II further includes a line-imaging unit and a sub-deflector. The line-imaging unit of the second optical writing module II is comprised of, for example, a first fθ lens 52 and a second fθ lens 62. The sub-deflector of the second optical writing module II is comprised of, for example, a first mirror 72, a second mirror 82 and a third mirror 92. When the rotary deflector 4 is rotated, the line-imaging unit and the sub-deflector in the second optical writing module II act to scan the image surface of the photoconductive medium 10 at a substantially uniform scanning rate along a second half S2 (or the right-side half in FIG. 12) of the main scanning line by focusing and deflecting the second beam, deflected by the rotary deflector 4, into a second spot on the image surface. The second beam is finally deflected by the third mirror 92 onto the image surface of the photoconductive medium 10.

In the optical scanning apparatus of FIG. 12, the first and second optical writing modules I and II scan the image surface of the photoconductive medium 10 such that the first and second halves of the main scanning line form a substantially straight scanning line with no discontinuity on the image surface. In the present embodiment, the first and second spots formed by the first and second imaging units are synchronously moved on the image surface of the photoconductive medium 10 from a middle point S0 of the main scanning line in opposite directions when the rotary deflector 4 is rotated.

In the optical scanning apparatus of FIG. 12, a sync detection unit 111 and a sync detection unit 112 are provided. The sync detection unit 111 is provided at a position outside a scanning range of the second optical writing module II, and detects a timing of start of the main scanning every time the main scanning (or the second half) over the photoconductive medium 10 is started by the second optical writing module II. The sync detection unit 112 is provided at a position outside a scanning range of the first optical writing module I, and detects a timing of start of the main scanning every time the main scanning (or the first half) over the photoconductive medium 10 is started by the first optical writing module II. An optical writing control unit (not shown) in the optical scanning apparatus of FIG. 12 acts to synchronize the emission of the first and second beams by the first and second light sources 11 and 12 with the timing of start of the main scanning by the first and second optical writing modules I and II based on the output signals of the sync detection units 112 and 111.

FIG. 13A is a top view of the optical scanning apparatus of FIG. 12.

In FIG. 13A, the position of a reflection surface of the first mirror 71 (or 72) or the second mirror 81 (or 82) where the light beam from the rotary deflector 4 is deflected to the third mirror 91 (or 92) is indicated by the slanted two-dot chain line. Also, the position of a reflection surface of the third mirror 91 (or 92) where the light beam from the first and second mirrors 71 and 81 (or 72 and 82) is finally deflected by the third mirror 91 (or 92) onto the image surface of the photoconductive medium 10 is indicated by the lateral two-dot chain line.

In FIG. 13A, a longitudinal axial direction of the photoconductive medium 10 is indicated by the lateral one-dot chain line, and an optical path of the first or second beam deflected by the rotary deflector 4 and further deflected by the sub-deflector 71 and 81 (or 72 and 82) is indicated by the slanted one-dot chain line. The arrow, attached to the element 4, indicates the rotating direction of the rotary deflector 4. The left- and right-ward arrows indicate the directions of movement of the first and second spots formed by the first and second imaging units on the image surface of the photoconductive medium 10 when the rotary deflector 4 is rotated.

FIG. 13B is a side view of the optical scanning apparatus of FIG. 13A when viewed in the axial direction of the photoconductive medium 10. The arrows of FIG. 13B indicate the optical paths of the first and second beams from the rotary deflector 4 through the first and second optical writing modules I and II in the optical scanning apparatus of the present embodiment.

It is necessary that, in the optical scanning apparatus of the present embodiment, the photoconductive medium 10 be enclosed in a dustproof enclosure (not shown). In the dustproof enclosure, appropriate openings are formed at positions where the first and second beams pass through the dustproof enclosure to reach the image surface of the photoconductive medium 10, and glass plates 121 and 122 are attached to the openings of the dustproof enclosure, as shown in FIG. 13B, in order to protect the photoconductive medium 10 against dust.

As described above, the second preferred embodiment of the optical scanning apparatus is configured such that the first and second spots formed by the first and second optical writing modules I and II are synchronously moved on the image surface of the photoconductive medium 10 from the middle point S0 of the main scanning line in opposite directions when the rotary deflector 4 is rotated. It is possible for the optical scanning apparatus of the present embodiment to easily synchronize the emission of the first and second beams by the first and second light sources 11 and 12 with the timing of start of the main scanning by the first and second optical writing modules I and II. Further, it is possible for the optical scanning apparatus of the present embodiment to improve the image quality at connecting portions between two halves of each main scanning line.

It should be noted that, in order to achieve the above-mentioned results, the optical scanning apparatus of the present embodiment is configured such that a first optical axis of the line-imaging unit (or the elements 51 and 61) is at an angle $\theta 1$ to the axial direction (indicated by the one-dot chain line Q) of the photoconductive medium 10 where $0°<|\theta 1|<90°$, a second optical axis of the line-imaging unit (or the elements 52 and 62) is at an angle $\theta 2$ to the axial direction of the photoconductive medium 10 where $0°<|\theta 2|<90°$, and the first and second sub-deflectors (or the elements 71, 72, 81, 82, 91 and 92) are configured such that the first and second beams deflected by the first and second sub-deflectors are incident to the image surface of the photoconductive medium 10 at 90°. See FIG. 13A for the configuration of the second preferred embodiment.

FIG. 13C is a diagram for explaining the positional relationship between the rotary deflector 4, the sub-deflector unit and the scanned image surface of the photoconductive drum 10 in the second preferred embodiment of the optical scanning apparatus. For the sake of simplicity of description, only the elements of the first optical writing module I are shown in FIG. 13C and the elements of the second optical writing module II are omitted.

It should be noted that, in order to achieve the above-mentioned results, the optical scanning apparatus of the second preferred embodiment is configured such that the first mirror 71 (or 72) is at an angle $\alpha$ to a plane that is perpendicular to the rotating axis of the rotary deflector 4 and parallel to the scanning line, the second mirror 81 (or 82) is at an angle $\beta$ to the above plane, and the first and second mirrors 71, 72, 81 and 82 of each of the imaging units are configured to meet the condition $|\alpha-\beta|=90°$. According to the above configuration, the second preferred embodiment of the optical scanning apparatus can easily synchronize the emission of the first and second beams by the first and second light sources 11 and 12 with the timing of start of the main scanning by the first and second optical writing modules I and II, and can improve the image quality at connecting portions between two halves of each main scanning line. See FIG. 13C for the configuration of the second preferred embodiment.

Figure 14:
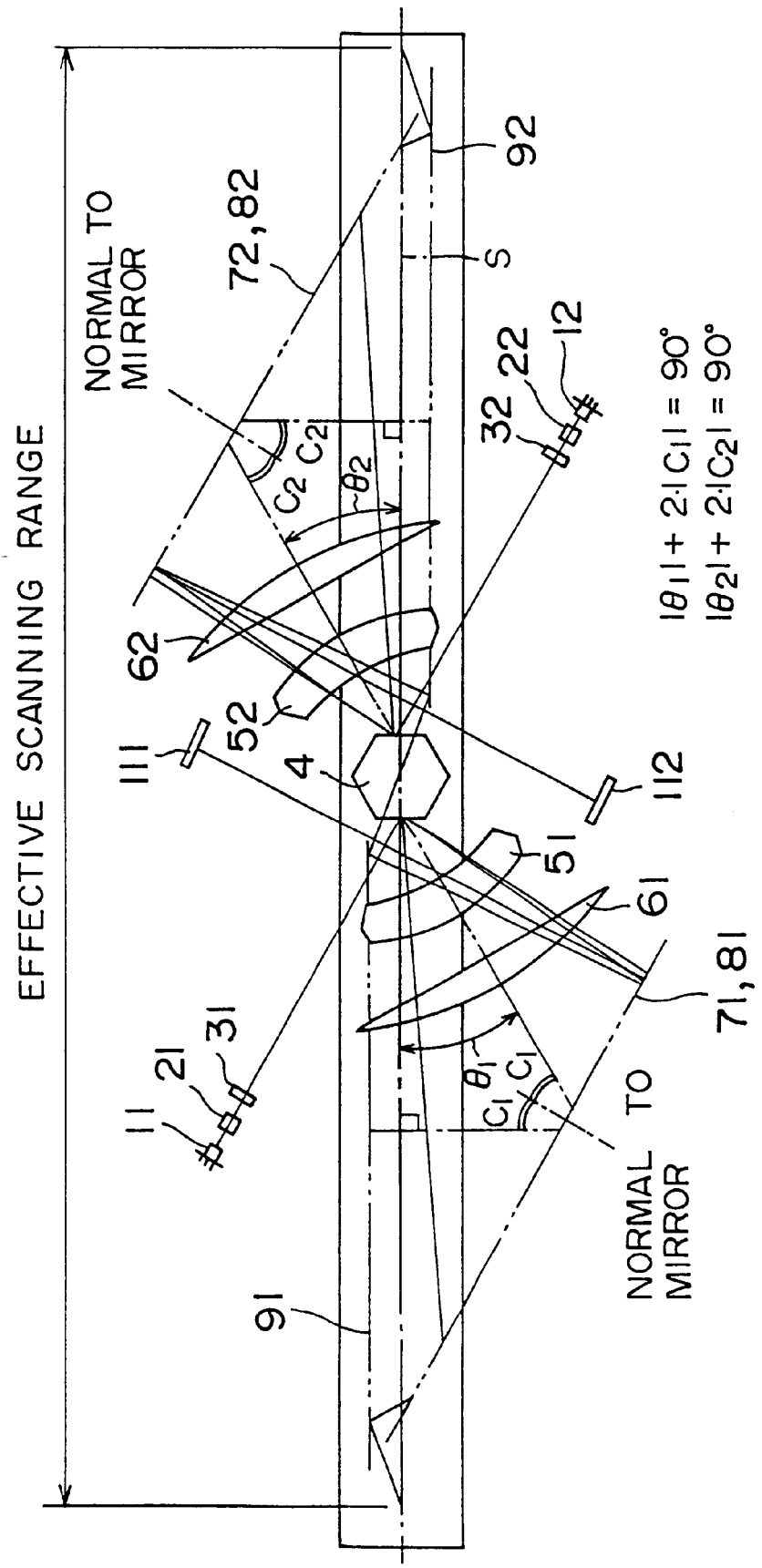
FIG. 14 is a diagram for explaining a positional relationship between a line-imaging unit, a sub-deflector and an image surface in the optical scanning apparatus of FIG. 12.

FIG. 14 shows a positional relationship between the line-imaging unit, the sub-deflector and the image surface in the optical scanning apparatus of FIG. 12. In FIG. 14, there is shown the positional relationship when the angle $\theta 1$ between the optical axis of the line-imaging unit in the first optical writing module I and the axial direction of the photoconductive medium 10 is nearly equal to the angle $\theta 2$ between the optical axis of the line-imaging unit in the second optical writing module II and the axial direction of the photoconductive medium 10 ($\theta 1=\theta 2$).

Figure 15:
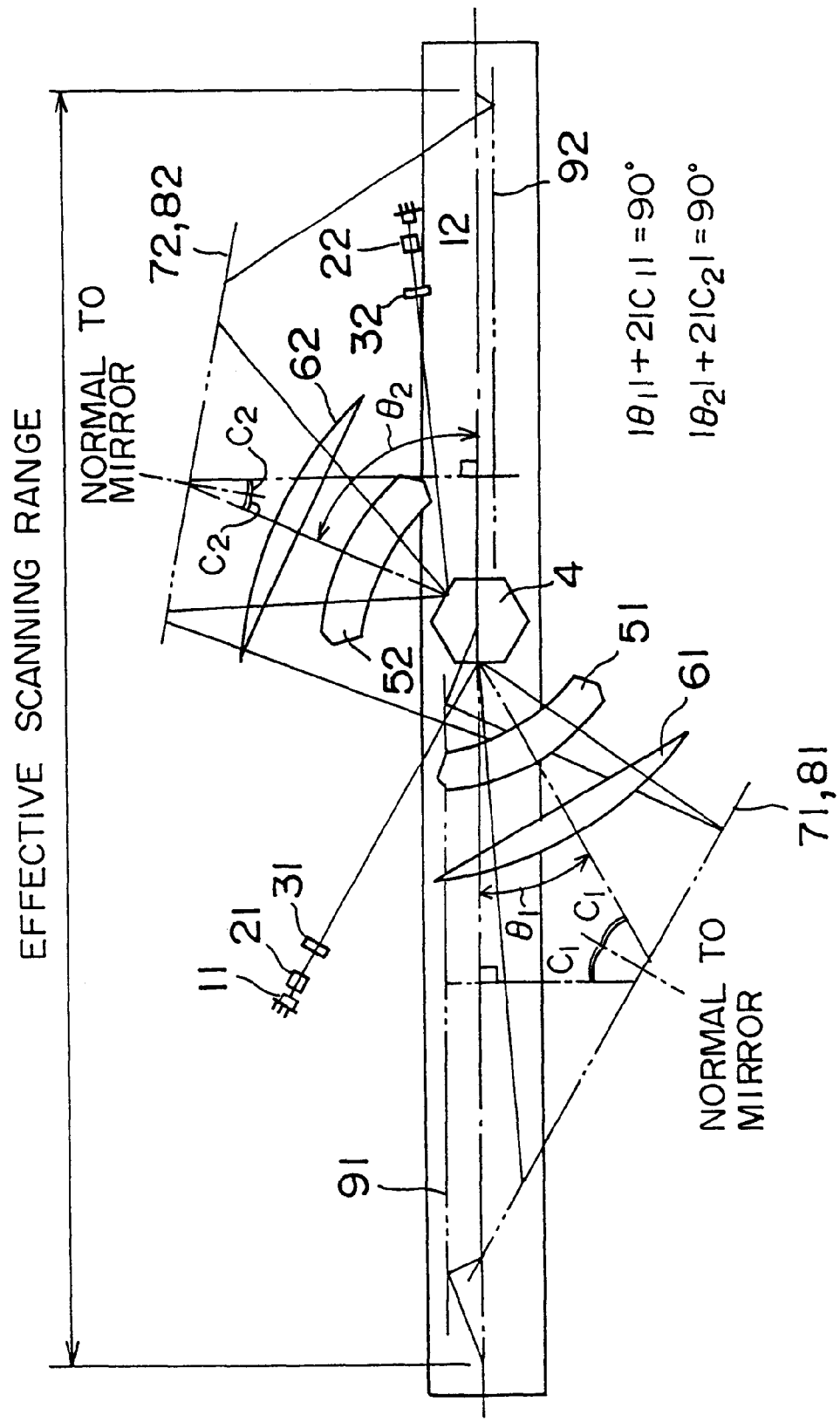
FIG. 15 is a diagram for explaining a positional relationship between the line-imaging unit, the sub-deflector and the image surface in a variation of the optical scanning apparatus of FIG. 12.

FIG. 15 shows another positional relationship between the line-imaging unit, the sub-deflector and the image surface in a variation of the optical scanning apparatus of FIG. 12. In FIG. 15, there is shown another positional relationship when the angle $\theta 1$ is significantly different from the angle $\theta 2$ ($\theta 1<\theta 2$).

As shown in FIG. 14 and FIG. 15, the optical axis of the line-imaging unit (or the elements 51 and 61) of the first optical writing module I is at the angle $\theta 1$ to the axial direction of the photoconductive medium 10 where $0°<|\theta 1|<90°$, and the optical axis of the line-imaging unit (or the elements 52 and 62) of the second optical writing module II is at the angle $\theta 2$ to the axial direction of the photoconductive medium 10 where $0°<|\theta 2|<90°$. The sub-deflectors (or the elements 71, 72, 81, 82, 91 and 92) of the first and second optical writing modules I and II are configured such that the first and second beams deflected by the first and second sub-deflectors are incident to the image surface at 90°.

In the second preferred embodiment of the optical scanning apparatus, the first beam deflected by the rotary deflector 4 along the optical axis of the line-imaging unit (the elements 51 and 61) is incident to the sub-deflector (the elements 71, 81 and 91) at an incidence angle C1, and the second beam deflected by the rotary deflector 4 along the optical axis of the line-imaging unit (the elements 52 and 62) is incident to the sub-deflector (the elements 72, 82 and 92) at an incidence angle C2. It should be noted that, in order to achieve the above-mentioned results, the first and second optical writing modules I and II in the present embodiment are configured to meet the conditions: $|\theta 1|+2°|C1|=90°$ and $|\theta 2|+2°|C2|=90°$. Accordingly, the optical scanning apparatus of the present embodiment is effective in producing a large-size image on the image surface of the photoconductive medium 10 and in improving the image quality at connecting portions between two halves of each main scanning line.

In the example shown in FIG. 14, the angle $\theta 1$ is nearly equal to the angle $\theta 2$. The scanning range of the first optical writing module I over the photoconductive medium 10 can be easily made substantially identical to the scanning range of the second optical writing module II over the photoconductive medium 10.

In the example shown in FIG. 15, the angle $\theta 1$ is quite different from the angle $\theta 2$ ($\theta 1<\theta 2$). This results in the scanning range of the first optical writing module I over the photoconductive medium 10 which is larger than the scanning range of the second optical writing module II over the photoconductive medium 10. However, this will be negligible in improving the image quality at connecting portions between two halves of each main scanning line. Even in the example of FIG. 15, the first and second optical writing modules I and II in the present embodiment are configured to meet the conditions: $|\theta 1|+2°|C1|=90°$ and $|\theta 2|+2°|C2|=90°$, and therefore the optical scanning apparatus of the present embodiment is effective in producing a large-size image on the image surface of the photoconductive medium 10 and in improving the image quality at connecting portions between two halves of each main scanning line.

Figure 11A:
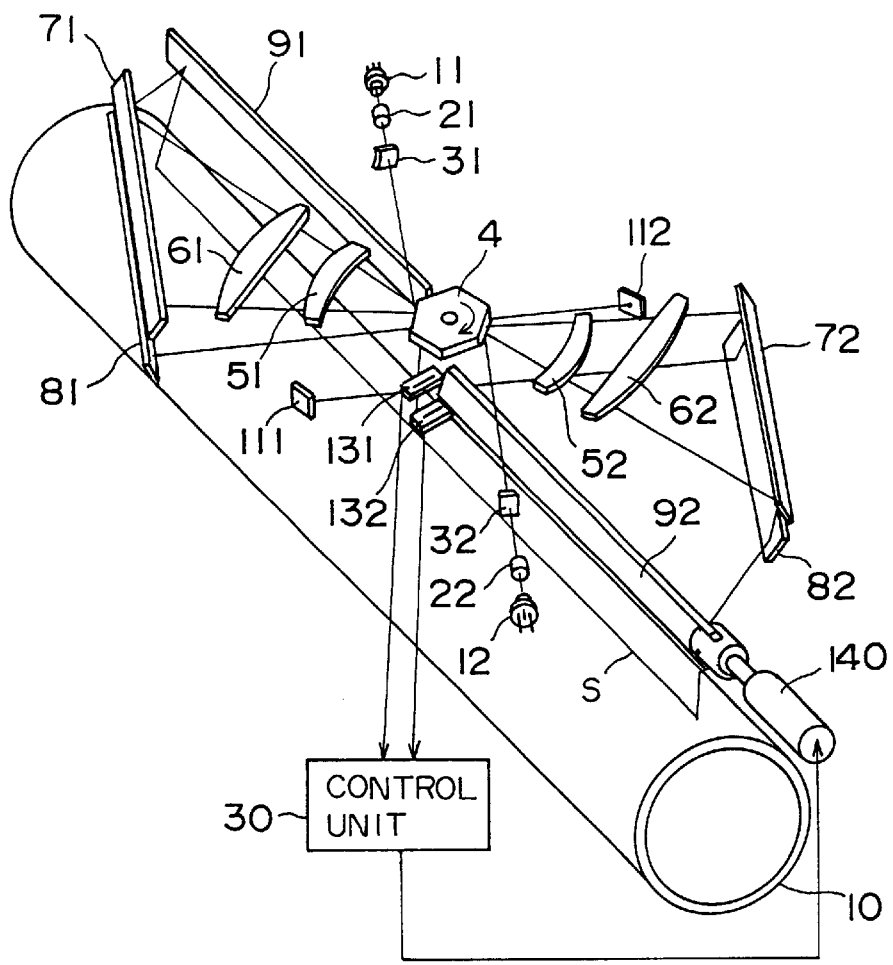
FIG. 11A is a perspective view of a second preferred embodiment of the optical scanning apparatus of the invention.
Figure 11B:
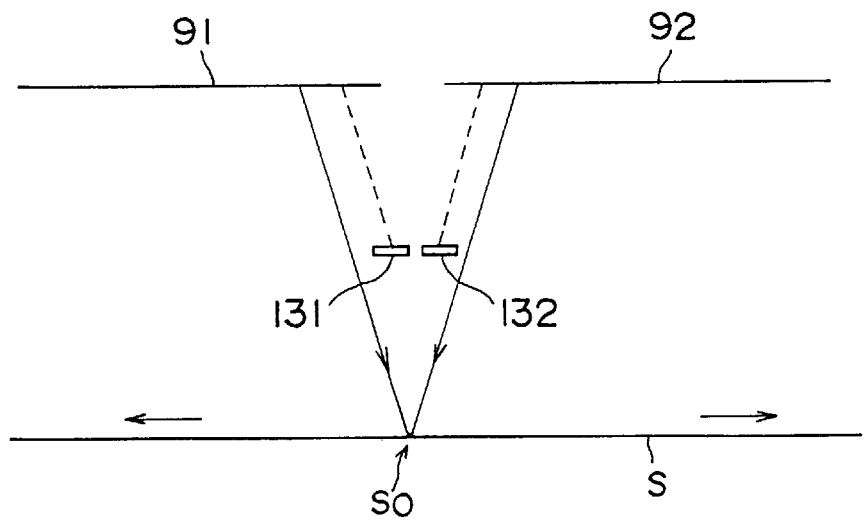
FIG. 11B is a diagram for explaining a configuration of a beam sync detection unit in the second preferred embodiment of the optical scanning apparatus of FIG. 11A.

FIG. 11A shows the second preferred embodiment of the optical scanning apparatus of the invention. FIG. 11B shows a configuration of the beam sync detection unit in the optical scanning apparatus of FIG. 11A. In FIG. 11A and FIG. 11B, the elements which are essentially the same as corresponding elements in FIG. 12 through FIG. 14 are designated by the same reference numerals.

As shown in FIG. 11A, the present embodiment of the optical scanning apparatus includes first and second beam sync detection units 131 and 132, a control unit 30, and a step motor 140. Other elements in the present embodiment are essentially the same as corresponding elements in the first preferred embodiment of FIG. 1, and a description thereof will be omitted.

The first beam sync detection unit 131 in this embodiment is constituted by a CCD (charge-coupled device) sensor. The first beam sync detection unit 131 is provided at a position adjacent to the middle point S0 of the main scanning line, and detects a position of start of the first half of the main scanning line produced by the first optical writing module I with respect to the sub-scanning direction. Similarly, the second beam sync detection unit 132 is constituted by a CCD sensor. The second beam sync detection unit 132 is provided at a position adjacent to the middle point of the main scanning line, and detects a position of start of the second half of the main scanning line produced by the second optical writing module II with respect to the sub-scanning direction. Each CCD sensor for the beam sync detection units 131 and 132 is arranged in parallel to the sub-scanning direction above the image surface of the photoconductive medium 10.

The beam sync detection units 131 and 132 are connected at their outputs to inputs of the control unit 30, and the control unit 30 is at its output to an input of the step motor 140. The step motor 140 is provided to rotate at least one of the third mirrors 91 and 92 around the rotating axis thereof by a controlled quantity of rotation in accordance with a drive signal output by the control unit 30. In the present embodiment, as shown in FIG. 11A, the step motor 140 rotates the third mirror 92 around the rotating axis thereof by the controlled quantity of rotation according to the drive signal output by the control unit 30. As at least one of the third mirrors 91 and 92 is rotated by the step motor 140, the position of start of the corresponding main scanning line on the image surface with respect to the sub-scanning direction is accordingly adjusted. The control unit 30 and the step motor 140 constitute a beam-scan position control unit in the optical scanning apparatus of FIG. 11A. Accordingly, the optical scanning apparatus of the present embodiment automatically controls the quantity of rotation of one of the first and second sub-deflectors (or the elements 91 and 92) with respect to the sub-scanning direction based on the detected positions output from the beam sync detection unit (or the elements 131 and 132). The use of the beam-sync detection unit (the elements 131 and 132) and the beam-scan position control unit (the elements 30 and 140) allows the first and second halves to form a substantially straight scanning line on the image surface when the rotary deflector 4 is rotated.

The configuration of FIG. 11B is that viewed in the sub-scanning direction which is perpendicular to the axial direction of the photoconductive medium 10 of FIG. 11A. As shown in FIG. 11B, the first beam is deflected by the third mirror 91 so as to produce a first spot on the image surface of the photoconductive medium 10, and, when the rotary deflector 4 is rotated, the first spot is moved in the left direction from the middle point S0 on the image surface. The second beam is deflected by the third mirror 92 so as to produce a second spot on the image surface of the photoconductive medium 10, and, when the rotary deflector 4 is rotated, the second spot is moved in the right direction from the middle point S0 on the image surface. The position of the middle point S0 at which the optical scanning of the laser beam on the image surface of the photoconductive medium 10 is started by the optical scanning apparatus is determined based on the results of the detection output from the sync detection units 112 and 111 shown in FIG. 11A.

In an image forming system to which the optical scanning apparatus of the present embodiment is applied, the adjustment of the timings of emission of the first and second light sources 11 and 12, which adjusts the positions of start of the first and second halves of the main scanning line with respect to the sub-scanning direction, is carried out immediately before the optical scanning by the optical scanning apparatus is started.

As shown in FIG. 11B, the beam-sync detection unit 131 detects a position of start of the first half of the main scanning line in the sub-scanning direction during the adjustment process of the image forming system. Similarly, the beam-sync detection unit 132 detects a position of start of the second half of the main scanning line in the sub-scanning direction.

In the optical scanning apparatus of FIG. 11A, a reference position of start of the corresponding one of the first and second halves of the main scanning line with respect to the sub-scanning direction is stored in a memory (not shown) of the control unit 30. During the adjustment process of the image forming system described above, the control unit 30 calculates a difference between the detected position output from the beam-sync detection unit and the stored reference position read from the memory thereof, and converts the calculated difference into a quantity of rotation of one of the first and second sub-deflectors (or the elements 91 and 92) around the rotating axis thereof. The resulting quantity of rotation of one of the first and second sub-deflectors around the rotating axis will eliminate the difference between the detected position and the stored reference position.

In the present embodiment, as shown in FIG. 11A and FIG. 11B, the beam sync detection unit (or the elements 131 and 132) detects both the position of start of the first half of the main scanning line in the sub-scanning direction and the position of start of the second half of the main scanning line in the sub-scanning direction. The beam-scan position control unit (or the elements 30 and 140) controls a quantity of rotation of one of the first and second sub-deflectors (or the elements 91 and 92) with respect to the sub-scanning direction based on the detected positions output from the beam sync detection unit, such that the first and second halves form a substantially straight scanning line on the image surface when the rotary deflector 4 is rotated.

In the optical scanning apparatus of the above-described embodiment, a single rotary deflector 4 is shared by the first and second optical writing modules I and II in order to scan the image surface of the photoconductive medium 10 along one of the first and second halves of the main scanning line by focusing and deflecting the light beam, deflected by the rotary deflector 4, into a spot on the image surface. The beam sync detection unit detects both a position of start of the first half of the main scanning line in the sub-scanning direction and a position of start of the second half of the main scanning line in the sub-scanning direction. The beam-scan position control unit controls a quantity of rotation of one of the first and second sub-deflectors (the elements 91 and 92) with respect to the sub-scanning direction based on the detected positions output from the beam sync detection unit, such that the first and second halves form a substantially straight scanning line with no discontinuity on the image surface when the rotary deflector 4 is rotated.

The optical scanning apparatus of the present embodiment is more effective in ensuring good image quality at the connecting portions between the halves of each main scanning line when producing a large-size image on the image surface of the photoconductive medium 10. As the present embodiment does not require a mechanism which synchronizes the timings of the rotation of plural rotary deflectors required by a conventional optical scanning apparatus, it is possible that the optical scanning apparatus of the present embodiment be configured in a compact, simple and inexpensive structure.

Figure 16A:
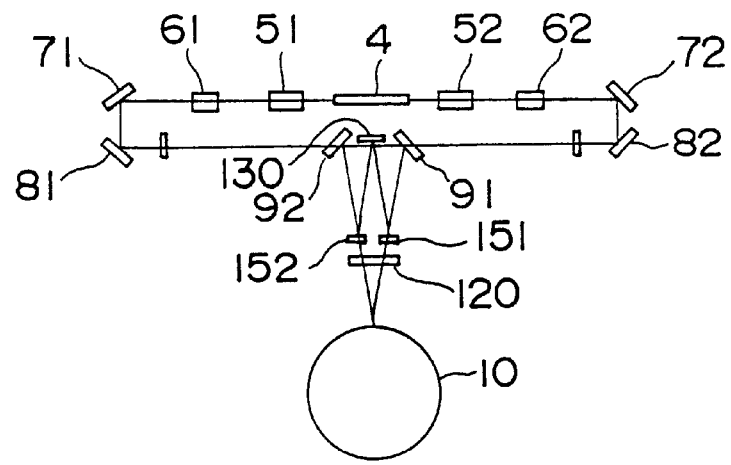
FIG. 16A, FIG. 16B and FIG. 16C are diagrams for explaining optical paths of first and second beams in a variation of the optical scanning apparatus of FIG. 12.
Figure 16B:
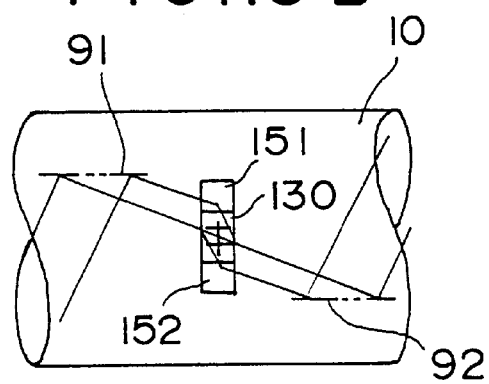
Figure 16C:
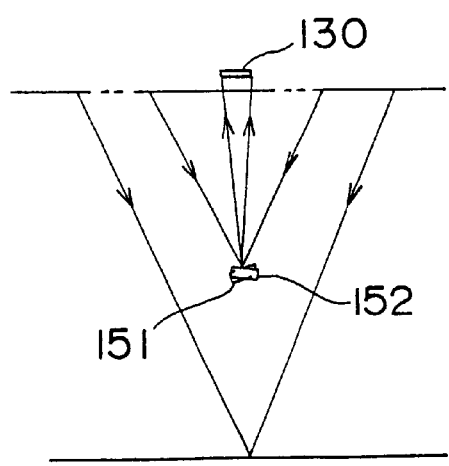

FIG. 16A, FIG. 16B and FIG. 16C are diagrams for explaining optical paths of first and second beams in a variation of the optical scanning apparatus of FIG. 12.

FIG. 16A is a side view of the optical paths of the first and second beams in the optical scanning apparatus of the present embodiment when viewed in the axial direction of the photoconductive medium 10. FIG. 16B is a top view of the optical paths of the first and second beams in the present embodiment. FIG. 16C is a side view of the optical scanning apparatus of the present embodiment when viewed in a horizontal direction perpendicular to the axial direction of the photoconductive medium 10.

As shown in FIG. 16A through FIG. 16C, in the present embodiment, first and second beam-detection mirrors 151 and 152 are provided in the optical path between the mirrors 91 and 92 and the image surface of the photoconductive medium 10. A single CCD (charge-coupled device) sensor 130 is provided at a position that is symmetrical to the image surface with respect to the beam-detection mirrors 151 and 152. The CCD sensor 130 is shared to detect both the positions of start of the first and second halves of the main scanning line on the image surface in the sub-scanning direction (which is horizontal and perpendicular to the main scanning direction in FIG. 16A).

Further, it is necessary that, in the optical scanning apparatus of the present embodiment, the photoconductive medium 10 be enclosed in a dustproof enclosure (not shown). In the dustproof enclosure, an appropriate opening is formed at a position where the first and second beams pass through the dustproof enclosure to reach the image surface of the photoconductive medium 10, and a glass plate 120 is attached to the opening of the dustproof enclosure, as shown in FIG. 16A, in order to protect the photoconductive medium 10 against dust.

In the above-described embodiment, the first and second beams deflected by the rotary deflector 4 are, respectively, deflected by the mirrors 91 and 92 to the first and second beam-detection mirrors 151 and 152. The first beam-detection mirror 151 reflects part of the first beam back to the CCD sensor 130. The second beam-detection mirror 152 reflects part of the second beam back to the CCD sensor 130. Hence, the CCD sensor 130 detects both the positions of start of the first and second halves of the main scanning line on the image surface in the sub-scanning direction.

Changes in the positions of the mirrors 151 and 152 due to thermal deformation of the housing of the image forming system will be negligible to the detection of such positions of the main scanning line on the image surface. The positional relationship between the beam-detection mirrors 151 and 152 and the CCD sensor 130 configured in the present embodiment is as shown in FIG. 16B and FIG. 16C.

In the embodiment of FIG. 16A through FIG. 16C, the single CCD sensor 130 is shared to detect both the positions of start of the first and second halves of the main scanning line on the image surface in the sub-scanning direction.

Figure 17A:
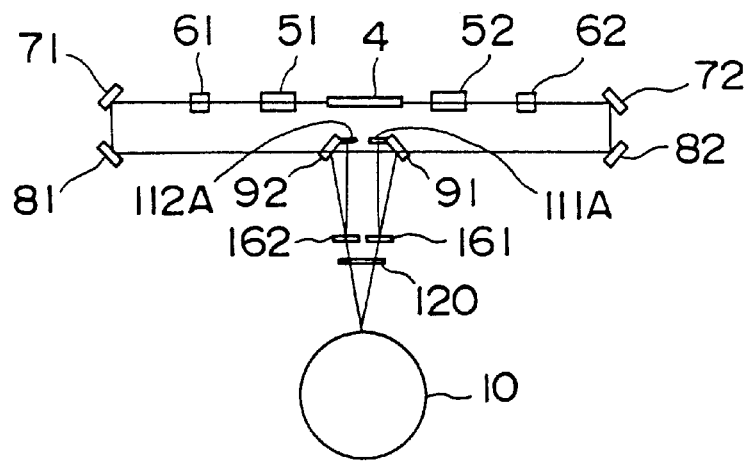
FIG. 17A, FIG. 17B and FIG. 17C are diagrams for explaining optical paths of first and second beams in another variation of the optical scanning apparatus of FIG. 12.
Figure 17B:
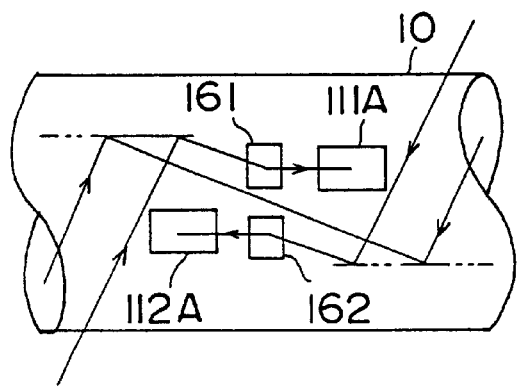
Figure 17C:
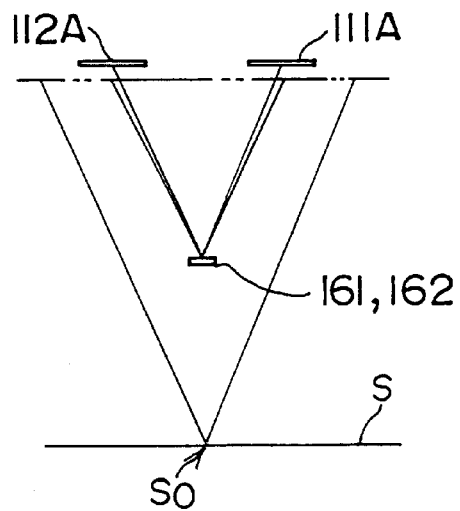

FIG. 17A, FIG. 17B and FIG. 17C are diagrams for explaining optical paths of first and second beams in another variation of the optical scanning apparatus of FIG. 12.

FIG. 17A is a side view of the optical paths of the first and second beams in the optical scanning apparatus of the present embodiment when viewed in the axial direction of the photoconductive medium. FIG. 17B is a top view of the optical paths of the first and second beams in the present embodiment. FIG. 17C is a side view of the optical scanning apparatus of the present embodiment when viewed in a horizontal direction perpendicular to the axial direction of the photoconductive medium 10.

As shown in FIG. 17A through FIG. 17C, in the present embodiment, the first and second beams deflected by the rotary deflector 4 are, respectively, deflected by the mirrors 91 and 92 to first and second sync-detection mirrors 161 and 162. The first sync-detection mirror 161 reflects part of the first beam back to a first sync detection unit 111A. The second sync-detection mirror 162 reflects part of the second beam back to a second sync detection unit 112A. The first sync detection unit 111A detects a displacement of the position of the first beam on the image surface from the main scanning line in a sub-scanning direction (which is horizontal and perpendicular to the main scanning direction in FIG. 17A). The second sync detection unit 112A detects a displacement of the position of the second beam on the image surface from the main scanning line in the sub-scanning direction.

Changes in the positions of the mirrors 161 and 162 due to thermal deformation of the housing of the image forming system will be negligible to the detection of such displacements of the beam positions on the image surface. The positional relationship between the sync-detection mirrors 161 and 162 and the sync detection units 111A and 112A configured in the present embodiment is as shown in FIG. 17B and FIG. 17C.

In the embodiment of FIG. 17A through FIG. 17C, the sync detection units 111A and 112A not only detect a position of start of the first half of the main scanning line in the sub-scanning direction and a position of start of the second half of the main scanning line in the sub-scanning direction, but also detect a displacement of the position of the first beam from the main scanning line in the sub-scanning direction and a displacement of the position of the second beam from the main scanning line in the sub-scanning direction.

Figure 18A:
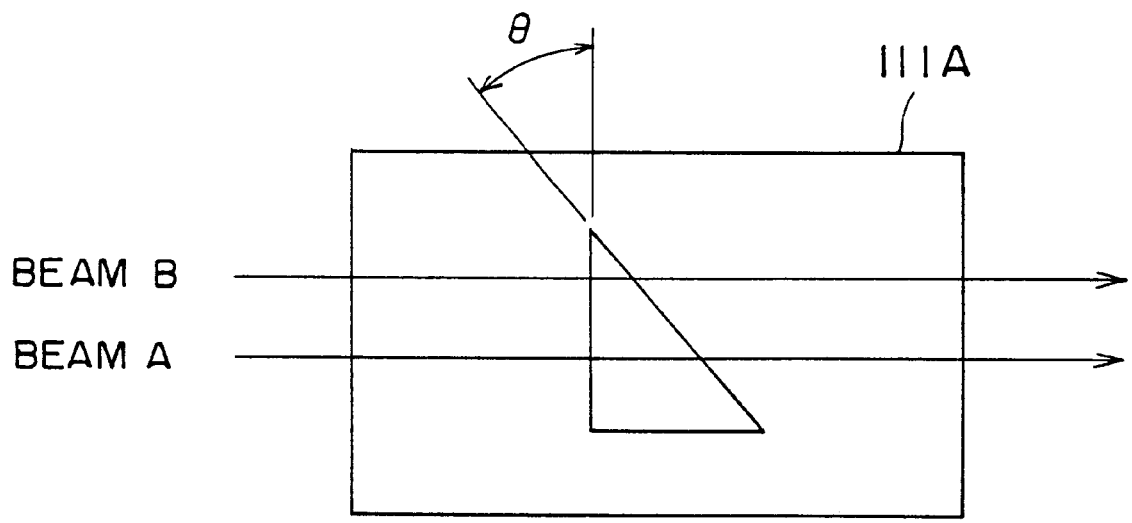
FIG. 18A and FIG. 18B are diagrams for explaining an operation of a sync detection unit in the optical scanning apparatus of FIG. 17A.
Figure 18B:
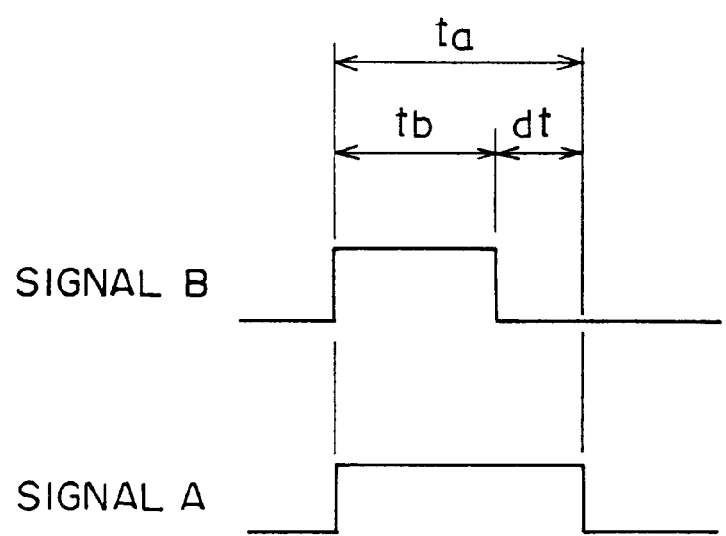

FIG. 18A and FIG. 18B are diagrams for explaining an operation of the sync detection unit 111A in the optical scanning apparatus of FIG. 17A. The operation of the sync detection unit 112A is essentially identical to the operation of the sync detection unit 111A, and a description thereof will be omitted.

As shown in FIG. 18A, the sync detection unit 111A includes a triangular-shaped light receiving area which the first beam deflected by the sync-detection mirror 161 passes through. The light receiving area has a given slope angle "θ" of the slanted side of the triangle. Suppose that, when a laser beam A passes through the light receiving area of the sync detection unit 111A, no displacement of the position of the first beam on the image surface from the main scanning line in the sub-scanning direction exists. The sync detection unit 111A at this time outputs a detection signal A in response to the received laser beam A. As shown in FIG. 18B, the detection signal A output by the sync detection unit 111A is indicative of a period "ta" of time for a high-level state of the signal A. Suppose that, when a laser beam B passes through the light receiving area, a displacement "Pv" of the position of the first beam on the image surface from the main scanning line in the sub-scanning direction takes place. The sync detection unit 111A at this time outputs a detection signal B in response to the received laser beam B. As shown in FIG. 18B, the detection signal B is indicative of a period "tb" of time for a high-level state of the signal B. A period "dt" indicates a difference between the period ta and the period tb.

As is apparent from the foregoing description, the displacement Pv can be determined by the equation: Pv=v(ta−tb)/tan θ=v dt/tan θ where v denotes a scanning speed of the first beam passed through the sync detection unit 111A. By using the above method, the sync detection unit 111A detects a displacement of the position of the first beam on the image surface from the main scanning line in the sub-scanning direction. Similarly, the sync detection unit 112A detects a displacement of the position of the second beam on the image surface from the main scanning line in the sub-scanning direction.

It is possible for the optical scanning apparatus of the present embodiment to suitably adjust the positions of the first and second beams on the image surface with respect to the sub-scanning direction based on the displacements detected by the first and second sync detection units 111A and 112A.

Figure 19A:
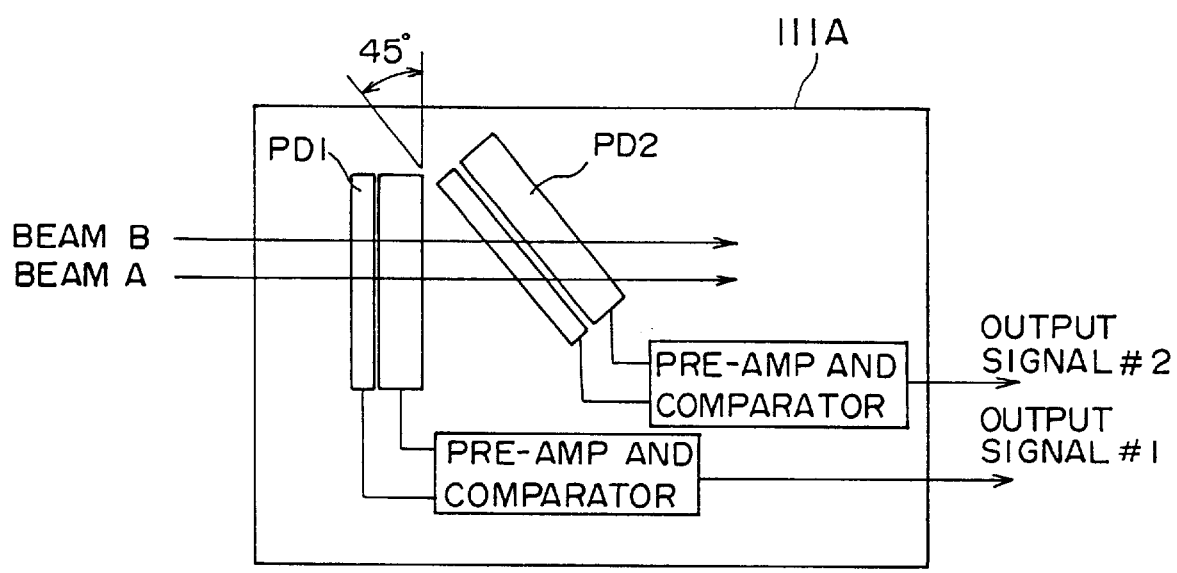
FIG. 19A and FIG. 19B are diagrams for explaining an operation of another sync detection unit in the optical scanning apparatus of FIG. 17A.
Figure 19B:
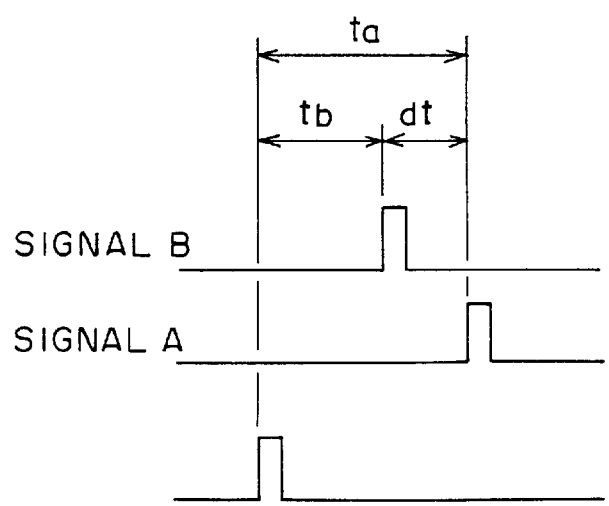

FIG. 19A and FIG. 19B are diagrams for explaining an operation of another sync detection unit 111A in the optical scanning apparatus of FIG. 17A. The operation of the sync detection unit 112A is essentially identical to the operation of the sync detection unit 111A, and a description thereof will be omitted.

As shown in FIG. 19A, the sync detection unit 111A includes a photodetector PD1 and a photodetector PD2, and the photodetector PD2 is slanted at an angle of 45° to the optical path of the first beam. Each of the photodetectors PD1 and PD2 is divided into two pieces and both the pieces are connected to inputs of a pre-amplifier and comparator circuit. When a laser beam passes through the photodetectors PD1 and PD2 in the sync detection unit 111A, the pre-amplifier and comparator circuits output signals #1 and #2 in response to the received beam. The signals #1 and #2 are converted into a pulsed signal which is indicative of a passing time needed for the laser beam to pass through the two photodetectors PD1 and PD2.

Suppose that, when a laser beam A passes through the photodetectors PD1 and PD2 of the sync detection unit 111A, no displacement of the position of the first beam on the image surface from the main scanning line in the sub-scanning direction exists. The sync detection unit 111A at this time outputs a detection signal A in response to the received laser beam A. As shown in FIG. 19B, the detection signal A output by the sync detection unit 111A is indicative of a period "ta" of time for a passing time of the laser beam A. Suppose that, when a laser beam B passes through the photodetectors PD1 and PD2, a displacement "Pv" of the position of the first beam on the image surface from the main scanning line in the sub-scanning direction takes place. The sync detection unit 111A at this time outputs a detection signal B in response to the received laser beam B. As shown in FIG. 19B, the detection signal B is indicative of a period "tb" of time for a passing time of the laser beam B. A period "dt" indicates a difference between the period ta and the period tb.

As is apparent from the foregoing description, the displacement Pv can be determined by the equation: Pv=v(ta−tb)/tan 45°=v dt where v denotes a scanning speed of the first beam passed through the sync detection unit 111A. By using the above method, the sync detection unit 111A detects a displacement of the position of the first beam on the image surface from the main scanning line in the sub-scanning direction. Similarly, the sync detection unit 112A detects a displacement of the position of the second beam on the image surface from the main scanning line in the sub-scanning direction.

It is also possible for the optical scanning apparatus of the present embodiment to suitably adjust the positions of the first and second beams on the image surface with respect to the sub-scanning direction based on the displacements detected by the first and second sync detection units 111A and 112A.

Figure 20A:
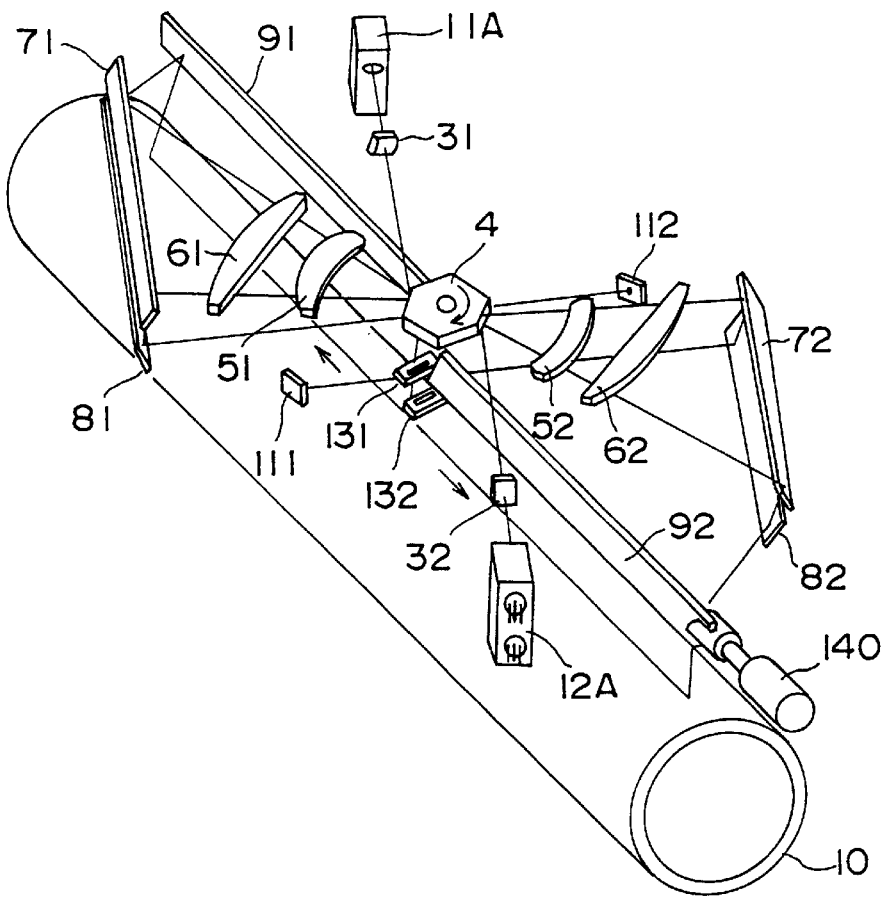
FIG. 20A and FIG. 20B are diagrams for explaining another preferred embodiment of the optical scanning apparatus of the invention.
Figure 20B:
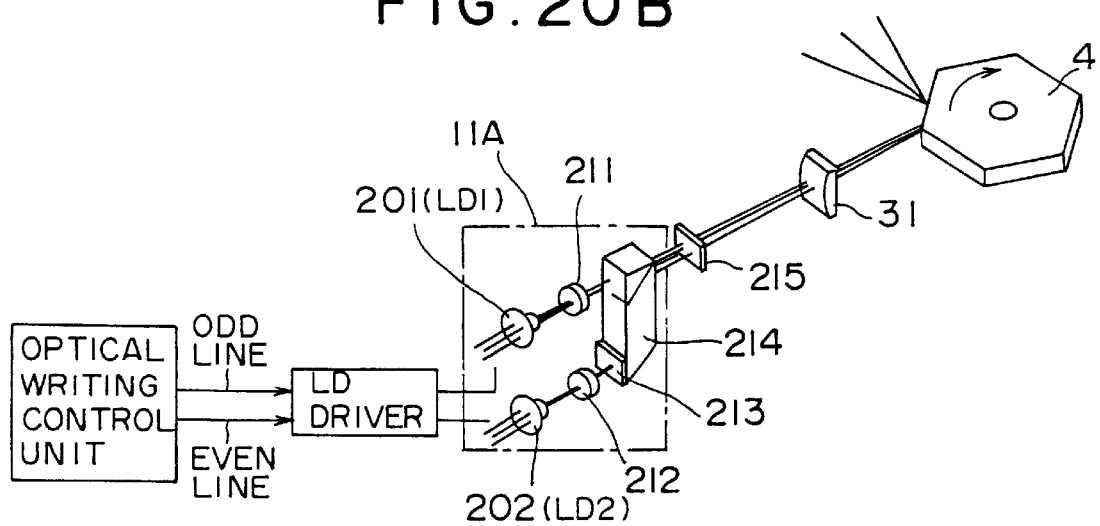

Next, FIG. 20A and FIG. 20B are diagrams for explaining another preferred embodiment of the optical scanning apparatus of the invention.

In the second preferred embodiment of FIG. 11A, each of the first and second light sources 11 and 12 is comprised of a laser diode which emits a single laser beam. The present invention is not limited to the second preferred embodiment. As shown in FIG. 20A, the first and second light sources in the optical scanning apparatus according to the invention may alternatively be comprised of first and second multi-beam light sources 11A and 12A without departing from the scope of the present invention.

FIG. 20B shows a configuration of the first multi-beam light source 11A in the optical scanning apparatus of FIG. 20A. The second multi-beam light source 12A may be configured in a manner identical to the first multi-beam light source 11A. As shown in FIG. 20B, the first multi-beam light source 11A includes a first laser diode 201 (LD1), a second laser diode 202 (LD2), a collimator lens 211, a collimator lens 212, a half-wave plate 213, a beam synthesis prism 214, and a quarter-wave plate 215. In the optical scanning apparatus of FIG. 20A, an optical writing control unit of FIG. 20B acts to synchronize the emission of the multiple laser beams by the first and second laser diodes 201 and 202 with the timing of start of the main scanning lines for both odd and even lines. An LD (laser diode) driver of FIG. 20B drives the first and second laser diodes 201 and 202 so as to emit multiple laser beams, based on a control signal output by the optical writing control unit. It is possible that the multi-beam optical scanning apparatus of the present embodiment increase the scanning speed needed to form an electrostatic image of a complete page on the photoconductive medium 10.

Figure 21:
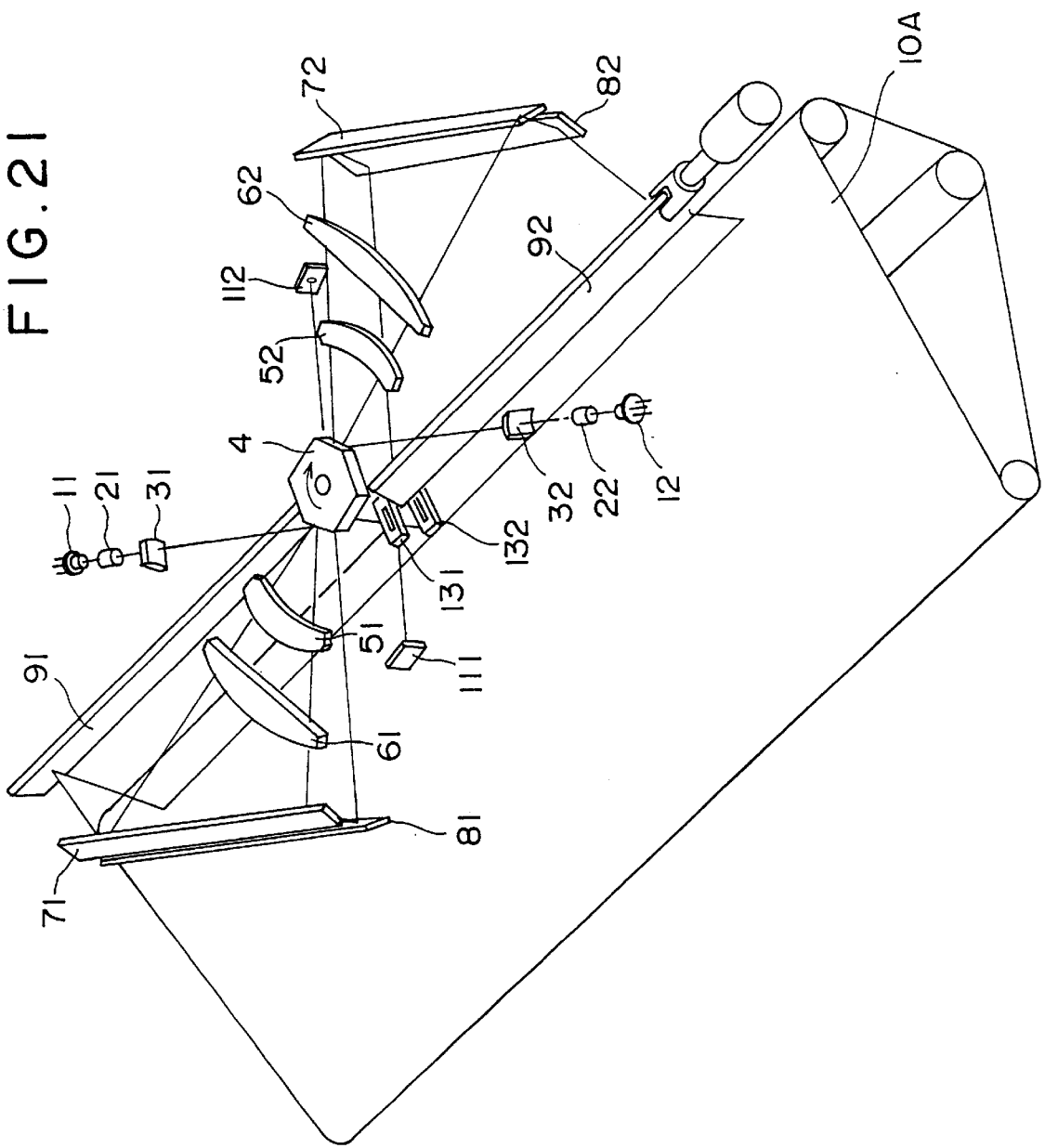
FIG. 21 is a diagram for explaining another preferred embodiment of the optical scanning apparatus of the invention.

FIG. 21 is a diagram for explaining another preferred embodiment of the optical scanning apparatus of the invention. In the second preferred embodiment of FIG. 11A, the photoconductive medium is comprised of the photoconductive drum 10. The present invention is not limited to the second preferred embodiment. As shown in FIG. 21, the photoconductive medium in the optical scanning apparatus according to the invention may alternatively be comprised of a belt-type photoconductive medium 10A without departing from the scope of the present invention.

The present invention is not limited to the above-described embodiments, and variations and modifications may be made without departing from the scope of the present invention.

Further, the present invention is based on Japanese priority application No.10-365095, filed on Dec. 22, 1998, and Japanese priority application No.11-075544, filed on Mar. 19, 1999, the entire contents of which are hereby incorporated by reference.

What is claimed is:

1. An optical scanning apparatus which scans an image surface of a photoconductive medium along a main scanning line by focusing and deflecting a light beam onto the image surface, so as to produce an electrostatic image on the image surface, comprising:
    a plurality of light sources which emit first and second beams;
    first and second coupling lens units which respectively couple the first and second beams emitted by the plurality of light sources;
    a rotary deflector, having pairs of mutually-opposite reflection surfaces, which deflects the first beam, coupled by the first coupling lens unit, in a first direction by one of the reflection surfaces, and deflects the second beam, coupled by the second coupling lens unit, in a second direction opposite to the first direction, by another of the reflection surfaces; and
    first and second imaging units which scan the image surface along a first half of the main scanning line by focusing and deflecting the first beam, deflected by the rotary deflector, into a first spot on the image surface, and scan the image surface along a second half of the main scanning line by focusing and deflecting the second beam, deflected by the rotary deflector, into a second spot on the image surface, such that the first and second halves form a substantially straight scanning line on the image surface when the rotary deflector is rotated.

2. The optical scanning apparatus of claim 1, wherein the first and second spots formed by the first and second imaging units are synchronously moved on the image surface from a middle point of the main scanning line in opposite directions when the rotary deflector is rotated.

3. The optical scanning apparatus of claim 1, wherein the photoconductive medium has a longitudinal axial direction, the first imaging unit includes a first optical axis and a first sub-deflector, the first optical axis being at an angle $\theta 1$ to the axial direction of the photoconductive medium where $0°<|\theta 1|<90°$, and the second imaging unit includes a second optical axis and a second sub-deflector, the second optical axis being at an angle $\theta 2$ to the axial direction of the photoconductive medium where $0°<|\theta 2|<90°$, and the first and second sub-deflectors being configured such that the first and second beams deflected by the first and second sub-deflectors are incident to the image surface at 90°.

4. The optical scanning apparatus of claim 3, wherein the rotary deflector has a rotating axis, and each of the first and second imaging units includes a first mirror and a second mirror, the first mirror being at an angle $\alpha$ to a plane being perpendicular to the rotating axis of the rotary deflector and parallel to the scanning line, the second mirror being at an angle $\beta$ to said plane, and the first and second mirrors of each imaging unit being configured to meet the condition $|\alpha-\beta|=90°$.

5. The optical scanning apparatus of claim 3, wherein the first beam deflected by the rotary deflector along the first optical axis is incident to the first sub-deflector at an incidence angle C1, and the second beam deflected by the rotary deflector along the second optical axis is incident to the second sub-deflector at an incidence angle C2, and the first and second imaging units being configured to meet the conditions: $|\theta 1|+2°|C1|=90°$ and $|\theta 2|+2°|C2|=90°$.

6. The optical scanning apparatus of claim 1, wherein the first imaging unit and the second imaging unit are configured to be substantially identical to each other.

7. An optical scanning apparatus which scans an image surface of a photoconductive medium along a main scanning line by focusing a deflected light beam into a spot on the image surface, so that an electrostatic image is produced on the scanned image surface, comprising:
    a plurality of light source means for emitting first and second beams;
    first and second coupling lens means for respectively coupling the first and second beams emitted by the plurality of light source means;
    rotary deflector means, having pairs of mutually-opposite reflection surfaces, for deflecting the first beam, coupled by the first coupling lens means, in a first direction by one of the reflection surfaces, and for deflecting the second beam, coupled by the second coupling lens means, in a second direction opposite to the first direction, by another of the reflection surfaces; and
    first and second imaging means for scanning the image surface along a first half of the main scanning line by focusing and deflecting the first beam, deflected by the rotary deflector means, into a first spot on the image surface, and for scanning the image surface along a second half of the main scanning line by focusing and deflecting the second beam, deflected by the rotary deflector means, into a second spot on the image surface, such that the first and second halves form a substantially straight scanning line on the image surface when the rotary deflector means is rotated.

8. An optical scanning apparatus which scans an image surface of a photoconductive medium along a main scanning line by focusing and deflecting a light beam onto the image surface, so as to produce an electrostatic image on the image surface, comprising:
    a plurality of light sources which emit first and second beams;
    first and second coupling lens units which respectively couple the first and second beams emitted by the plurality of light sources;
    a rotary deflector, having pairs of mutually-opposite reflection surfaces, which deflects the first beam, coupled by the first coupling lens unit, in a first direction by one of the reflection surfaces, and deflects the second beam, coupled by the second coupling lens unit, in a second direction opposite to the first direction, by another of the reflection surfaces;
    first and second imaging units which scan the image surface along a first half of the main scanning line by focusing and deflecting the first beam, deflected by the rotary deflector, onto the image surface, and scan the image surface along a second half of the main scanning line by focusing and deflecting the second beam, deflected by the rotary deflector, onto the image surface, wherein the first imaging unit includes a first optical axis and a first sub-deflector, and the second imaging unit includes a second optical axis and a second sub-deflector;
    a beam sync detection unit which detects both a position of start of the first half of the main scanning line in a sub-scanning direction and a position of start of the second half of the main scanning line in the sub-scanning direction; and
    a beam-scan position control unit which controls a quantity of rotation of one of the first and second sub-deflectors with respect to the sub-scanning direction based on the detected positions output from the beam sync detection unit, such that the first and second halves form a substantially straight scanning line on the image surface when the rotary deflector is rotated.

9. The optical scanning apparatus of claim 8, wherein the beam sync detection unit includes a single CCD sensor which is shared to detect both the positions of start of the first and second halves of the main scanning line on the image surface in the sub-scanning direction.

10. The optical scanning apparatus of claim 8, wherein the beam sync detection unit includes a sync detection unit which detects a displacement of the position of the first beam from the main scanning line in the sub-scanning direction and a displacement of the position of the second beam from the main scanning line in the sub-scanning direction.

11. The optical scanning apparatus of claim 8, further comprising a step motor which rotates one of the first and second sub-deflectors in response to a control signal output from the beam-scan position control unit, wherein the beam-scan position control unit controls said step motor by using the control signal based on the positions detected by the beam sync detection unit.

12. The optical scanning apparatus of claim 8, wherein the plurality of light sources are comprised of laser diodes, the rotary deflector is comprised of a rotary polygonal mirror, and each of the first and second coupling lens units includes a coupling lens and a cylindrical lens.

13. The optical scanning apparatus of claim 8, wherein the first optical axis is at an angle $\theta 1$ to a longitudinal axial direction of the photoconductive medium where $0°<|\theta 1|<90°$, and the second optical axis is at an angle $\theta 2$ to the axial direction of the photoconductive medium where $0°<|\theta 2|<90°$, and the first and second sub-deflectors being configured such that the first and second beams deflected by the first and second sub-deflectors are incident to the image surface at 90°.

14. The optical scanning apparatus of claim 8, wherein each of the first and second imaging units includes a first mirror and a second mirror, the first mirror being at an angle $\alpha$ to a plane being perpendicular to a rotating axis of the rotary deflector and parallel to the scanning line, the second mirror being at an angle $\beta$ to said plane, and the first and second mirrors of each imaging unit being configured to meet the condition $|\alpha-\beta|=90°$.

15. The optical scanning apparatus of claim 8, wherein the first beam deflected by the rotary deflector along the first optical axis is incident to the first sub-deflector at an incidence angle C1, the second beam deflected by the rotary deflector along the second optical axis being incident to the second sub-deflector at an incidence angle C2, and the first and second imaging units being configured to meet the conditions: $|\theta 1|+2°|C1|=90°$ and $|\theta 2|+2°|C2|=90°$.

16. An image forming system in which an electrostatically-charged image surface of a photoconductive medium is linearly scanned along a main scanning line by an optical scanning apparatus by focusing and deflecting a light beam onto the image surface, so as to produce an electrostatic image on the image surface, the optical scanning apparatus comprising:

a plurality of light sources which emit first and second beams;

first and second coupling lens units which respectively couple the first and second beams emitted by the plurality of light sources;

a rotary deflector, having pairs of mutually-opposite reflection surfaces, which deflects the first beam, coupled by the first coupling lens unit, in a first direction by one of the reflection surfaces, and deflects the second beam, coupled by the second coupling lens unit, in a second direction opposite to the first direction, by another of the reflection surfaces;

first and second imaging units which scan the image surface along a first half of the main scanning line by focusing and deflecting the first beam, deflected by the rotary deflector, onto the image surface, and scan the image surface along a second half of the main scanning line by focusing and deflecting the second beam, deflected by the rotary deflector, onto the image surface, wherein the first imaging unit includes a first optical axis and a first sub-deflector, and the second imaging unit includes a second optical axis and a second sub-deflector;

a beam sync detection unit which detects both a position of start of the first half of the main scanning line in a sub-scanning direction and a position of start of the second half of the main scanning line in the sub-scanning direction; and a beam-scan position control unit which controls a quantity of rotation of one of the first and second sub-deflectors with respect to the sub-scanning direction based on the detected positions output from the beam sync detection unit, such that the first and second halves form a substantially straight scanning line on the image surface when the rotary deflector is rotated.

17. An optical scanning apparatus which scans an image surface of a photoconductive medium along a main scanning line by focusing and deflecting a light beam onto the image surface, so as to produce an electrostatic image on the image surface, comprising:

a plurality of light source means for emitting first and second beams;

first and second coupling lens means for respectively coupling the first and second beams emitted by the plurality of light sources;

rotary deflector means, having pairs of mutually-opposite reflection surfaces, for deflecting the first beam, coupled by the first coupling lens means, in a first direction by one of the reflection surfaces, and for deflecting the second beam, coupled by the second coupling lens means, in a second direction opposite to the first direction, by another of the reflection surfaces;

first and second imaging means for scanning the image surface along a first half of the main scanning line by focusing and deflecting the first beam, deflected by the rotary deflector means, onto the image surface, and for scanning the image surface along a second half of the main scanning line by focusing and deflecting the second beam, deflected by the rotary deflector means, onto the image surface, wherein the first imaging means includes a first optical axis and a first sub-deflector, and the second imaging means includes a second optical axis and a second sub-deflector;

beam sync detection means for detecting both a position of start of the first half of the main scanning line in a sub-scanning direction and a position of start of the second half of the main scanning line in the sub-scanning direction; and beam-scan position control means for controlling a quantity of rotation of one of the first and second sub-deflectors with respect to the sub-scanning direction based on the detected positions output from the beam sync detection means, such that the first and second halves form a substantially straight scanning line on the image surface when the rotary deflector means is rotated.

* * * * *